US007349364B2

United States Patent
Omae et al.

(10) Patent No.: US 7,349,364 B2
(45) Date of Patent: Mar. 25, 2008

(54) MOBILITY MANAGEMENT SYSTEM, AND MOBILE NODE USED IN THE SYSTEM, MOBILITY MANAGEMENT METHOD, MOBILITY MANAGEMENT PROGRAM, AND MOBILITY MANAGEMENT NODE

(75) Inventors: Koji Omae, Yokohama (JP); Ichiro Okajima, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 854 days.

(21) Appl. No.: 10/260,432

(22) Filed: Oct. 1, 2002

(65) Prior Publication Data
US 2003/0073452 A1 Apr. 17, 2003

(30) Foreign Application Priority Data
Oct. 2, 2001 (JP) ............... 2001-306650

(51) Int. Cl.
*H04Q 7/00* (2006.01)
(52) U.S. Cl. .............. 370/328; 370/338; 370/401; 370/349
(58) Field of Classification Search ............ None
See application file for complete search history.

(56) References Cited

U.S. PATENT DOCUMENTS

| 6,501,746 | B1* | 12/2002 | Leung ............. 370/338 |
| 6,567,664 | B1* | 5/2003 | Bergenwall et al. ..... 455/435.1 |
| 6,625,135 | B1* | 9/2003 | Johnson et al. ......... 370/332 |
| 6,636,498 | B1* | 10/2003 | Leung ............. 370/338 |
| 6,721,291 | B1* | 4/2004 | Bergenwall et al. ....... 370/331 |
| 6,917,605 | B2* | 7/2005 | Kakemizu et al. ........ 370/338 |
| 6,937,590 | B2* | 8/2005 | Lee ............... 370/338 |
| 6,973,057 | B1* | 12/2005 | Forslow ............ 370/328 |
| 6,987,771 | B2* | 1/2006 | Shimizu et al. ......... 370/401 |
| 2002/0039367 | A1* | 4/2002 | Seppala et al. ......... 370/401 |

OTHER PUBLICATIONS

Koji Omae, et al., "Hierarchical Mobile IPv6 Extension for IP-based Mobile Communications System", The Institute of Electronics, Information and Communication Engineers, Technical Report of IEICE in 2001-178, Feb. 2002, pp. 25-32, (w/English Abstract).
Seisho Yasukawa, et al., "A route optimization method and smooth handover method with RSVP signaling in a mobile IPv6 network", B-6-88, Aug. 29, 2001, p. 144.

(Continued)

*Primary Examiner*—Bob A. Phunkulh
(74) *Attorney, Agent, or Firm*—Oblon, Spivak, McClelland, Maier & Neustadt, P.C.

(57) ABSTRACT

When a mobile node MN moves from an access router AR3 to another access router AR4, it sends a multi-binding on request to a mobility agent MA1 and then moves (①). Receiving the multi-binding on request, the mobility agent MA1 voluntarily configures prospective CoA's (probable CoA's) The probable CoA's are added as forwarding addresses while an M bit is set on in an register of the mobile node MN on a binding cache (②). When the mobility agent MA1 receives a capsuled packet addressed to the mobile node MN thereafter, it tunnel-forwards the packet to CoA3, probable CoA2, and probable CoA4 according to the binding cache (③).

16 Claims, 19 Drawing Sheets

OTHER PUBLICATIONS

Charles Perkins, et al., "Mobility Support in IPv6", Internet-Draft draft-perkins ipv6-mobility-sup-02, txt, Jul. 8, 1995, 18 pages.

Karim El Malki, et al., "Simultaneous Bindings for Mobile IPv6 Fast Handoffs", Internet-Draft draft-elmalki-mobileip-bicasting-v6-00, txt, Jun. 2002, 13 pages.

David B. Johnson, et al., "Mobility Support in IPv6", Internet-Draft draft-ietf-mobileip-ipv6-18, txt Jun. 1, 2002, 133 pages.

Hesham Soliman, et al., "Hierarchical MIPv6 mobility management (HMIPv6)", Internet-Draft draft-ietf-mobileip-hmipv6-06, txt, Jul. 2002, 29 pages.

* cited by examiner

Fig.7

| target address | multi-binding bit | forwarding address (TRANSIT ROUTING ADDRESS) |
|---|---|---|
| Mobile Node 1 | off | CoA1 |
| Mobile Node 2 | off | CoA2 |
| Mobile Node 3 | off | CoA3 |
| Mobile Node 4 | off | CoA4 |

Fig.8

| target address | multi-binding bit | forwarding address (TRANSIT ROUTING ADDRESS) |
|---|---|---|
| Mobile Node 5 | off | CoA5 |
| Mobile Node 6 | off | CoA6 |
| Mobile Node 7 | on | CoA7, CoA8, CoA9, CoA10 |
| Mobile Node 8 | off | CoA11 |

THE CASE OF MOVEMENT BETWEEN MA SERVICE AREAS

THE CASE OF MOVEMENT IN SERVICE AREA OF SAME MA

MOBILITY MANAGEMENT SYSTEM, AND MOBILE NODE USED IN THE SYSTEM, MOBILITY MANAGEMENT METHOD, MOBILITY MANAGEMENT PROGRAM, AND MOBILITY MANAGEMENT NODE

BACKGROUND OF THE INVENTION

1. Field of the Invention

The present invention relates to a mobility management system, and a mobile node, a mobility management method, and a mobility management program used in the system and, more particularly, to a mobility management system for improving the mobility of a mobile node performing telecommunications on a network for telecommunications of the packet switching system like Internet, and a mobile node used in the system, a mobility management method, a mobility management program, and a mobility management node.

2. Related Background Art

FIG. 1 is an illustration for explaining a network architecture of a conventional packet telecommunication system. In the drawing a cloud indicates a network having an arbitrary topology consisting of a plurality of nodes and links. The nodes called routers in the cloud hold routing information through action of a routing control protocol such as OSPF (Open Shortest Path First) or the like.

Each router is able to accurately forward a packet addressed to any node other than its own node, to an area where the destination node exists. This cloud routing the packet in this way on the basis of the address system of IP (Internet Protocol) will be herein after called an IP packet telecommunication system.

The same figure shows a mobile node MN, a home agent HA, a mobility agent MA1 and a mobility agent MA2 being nodes that perform mobility management, and access routers AR1-AR8.

The mobile node MN is a node that performs communications with another node while changing a connected link from one to another with movement. The home agent HA is a node that provides a home link to the mobile node MN.

The access routers AR1-AR8 are nodes that provide foreign links to the mobile node MN. A correspondent node CN is a node that performs communications with the mobile node MN.

The mobility agents MA1 and MA2 are nodes that have their respective, definite service areas and perform the forwarding operation of a packet addressed to the mobile node MN under connection with an access router AR in the service area. The service areas of the mobility agent MA1 and the mobility agent MA2 are indicated by respective dashed lines in the same figure. These mobility agents MA1 and MA2 function as nodes performing the mobility management.

There exist the access routers AR1-AR4 in the service area of the mobility agent MA1. On the other hand, there exist the access routers AR5-AR8 in the service area of the mobility agent MA2.

The mobile node MN in motion between foreign links uses a home address used in the home link, and a link c/o address (Care of Address; which will be hereinafter referred to as CoA) used in each foreign link. The home address is an address that is continuously used even with change of a connected link to another. CoA is an address that is acquired at every change to a connected link and that specifies the mobile node in the connected link.

The following will describe the operation of the conventional "Hierarchical Mobile IPv6" with reference to FIG. 2. The mobile node MN moves away from the home link to an foreign link, and ① receives Router Advertisement (hereinafter, RA) sent from an access router.

② The mobile node MN adds a token of a radio interface of its own node to a prefix (an identifier of the subnet) included in RA, to configure CoA (CoA3 in the figure) (stateless address autoconfiguration). The token herein refers to a hardware address for uniquely identifying a radio interface.

③ The mobile node MN sends a packet called Binding Update (hereinafter, BU) including binding of CoA and the home address, to a mobility agent (the mobility agent MA1 in the figure). The mobile node MN is able to know an address of the mobility agent from the information in RA sent from the access router.

④ The mobility agent, receiving the BU packet, records the binding information in the BU packet, in its cache.

⑤ The mobility agent sends a binding acknowledgement received, to the mobile node MN.

⑥ When receiving the binding acknowledgement from the mobility agent, the mobile node MN sends to the home agent HA a BU packet including binding of the address of the mobility agent and the home address.

⑦ The home agent HA, receiving the BU packet, records this binding information in its cache.

FIG. 3 shows a state in which the foregoing caches are present at the home agent HA and at the mobility agent. In the same figure, the correspondent node CN is a node that performs communications with the mobile node MN. When the correspondent node CN sends a packet I directed to the home address of the mobile node, the packet I is normally routed by the routers in the network. When the packet I arrives at the home link of the mobile node MN, it is captured at the home link by the home agent HA. The home agent HA creates an IP packet a destination of which is the address (the address of the mobility agent) bound to the home address of the mobile node MN as the destination of the packet I, and stores the packet I in a payload portion of the IP packet. The method of storing another packet in the payload portion of a certain packet in this way is called tunneling and such a packet is called a tunneling packet. The tunneling packet II prepared according to the above procedure by the home agent HA is delivered to the mobility agent by the routers in the network. The mobility agent takes the packet I out of the payload of the tunneling packet II and searches data on the cache for the home address of the mobile node MN which is the destination of the packet. Then the mobility agent creates a new tunneling packet III a destination of which is the CoA bound to the home address of the mobile node MN, stores the packet I in the payload portion of the tunneling packet III, and sends the tunneling packet III. The tunneling packet III is routed to the mobile node MN, so that the mobile node MN can receive the tunneling packet III directed to the CoA and process the packet I stored in the tunneling packet. The above procedure permits the mobile node MN to receive the packet directed to the home address of the mobile node MN, on the foreign link where the mobile node MN visits.

Thereafter, the mobile node MN notifies the mobility agent of the binding of the home address and CoA by the BU packet every time the mobile node MN acquires a new CoA with movement between eternal links in the service area of the mobility agent. When the mobile node changes the link from one to another in the service area of the same mobility agent, it needs only to notify the mobility agent of CoA of a new link, so as to be able to establish the aforementioned packet forwarding route of the correspondent node CN→the home agent HA→the mobility agent→the mobile node MN, while notifying the home agent HA of nothing.

On the other hand, when the mobile node MN moves between access routers AR of different mobility agent service areas and acquires a new CoA, it notifies the mobility agent of the binding of the home address and the CoA by the BU packet. When receiving a binding acknowledgement from the mobility agent, the mobile node MN notifies the home agent HA of the binding of the home address and the address of the mobility agent by the BU packet. As described, when the mobile node moves between access routers AR of different mobility agent service areas, it sends the BU packet to each of the new mobility agent and the home agent HA, so as to be able to establish a packet forwarding route of the correspondent node CN→the home agent HA→the mobility agent→the mobile node MN.

The basic operations of the home agent and the mobile node in Mobile IPv6 are disclosed by, for example, D. B. Johnson, C. Perkins and J. Arkko in "Mobility Support in IPv6," draft-ietf-mobileipv6-mobileip-18.txt, July 2002 (work in progress). http://ww.ietf.org/internet-drafts/draft-ieif-mobileip-ipv6-18.txt>.

Further, the basic operation of Mobility Anchor Point (MAP) in Hierarchical Mobile IPv6 is disclosed by H. Soliman and K. El-Malki in "Hierarchical MIPv6 Mobility Management (HMIPv6)," draft-ietf-mobileip-hmipv6-06.txt, July 2002 (work in progress). <http://ww.ietf.org/internet-drafts/draft-ietf-mobileip-hmipv6-06.txt>.

SUMMARY OF THE INVENTION

The prior art described above requires the following steps after the transition between links and before the establishment of the forwarding route:

① the step of configuring a CoA;
② the step of notifying the mobility agent of the CoA;
③ the step of notifying the home agent of the new mobility agent (if the mobility agent service area is changed to another).

Namely, there is such a drawback that the packet forwarding route is not established for a period after the transition between foreign links and before completion of the sequence of these steps and a packet sent from the correspondent node CN during this period is not delivered to the mobile node MN.

The present invention has been accomplished in order to overcome the drawback in the above-stated prior art, and an object of the invention is to provide a mobility management system capable of reducing the time before the establishment of the packet forwarding route, and a mobile node, a mobility management method, and a mobility management program used in the system.

A mobility management system of the present invention as set forth in claim 1 is a mobility management system in a packet telecommunication network, which comprises a plurality of access routers for providing links to a mobile node, and a plurality of mobility management nodes for managing mobility of the mobile node, and in which the mobile node uses a home address continuously used even with change of a connected link to another and a c/o address acquired at every change to a connected link and specifying the mobile node in the connected link, wherein each of said mobility management nodes comprises cache means for storing binding between a home address and a c/o address about the mobile node; c/o address configuring means for voluntarily configuring a plurality of new c/o addresses that are probably used by the mobile node after change of a connected link to another, in response to a first request from the mobile node; and storing means for storing the plurality of c/o addresses thus configured, in binding relation with the home address of the mobile node in said cache means.

A mobility management system of the present invention as set forth in claim 2 is the mobility management system according to claim 1, wherein each of said mobility management nodes further comprises forwarding means adapted so that, when receiving a packet to the home address stored in binding relation with a plurality of c/o addresses in said cache means, the forwarding means forwards the packet to the plurality of c/o addresses. This configuration permits tunnel forwarding (tunneling) to each of the plurality of forwarding addresses bound to the home address.

In the system constructed in this configuration, when the mobile node moves from a certain link (an foreign link) to another link (an foreign link or a home link), the mobile node is able to receive a packet forwarded to the c/o addresses independently configured by the mobility management node before the mobile node notifies the mobility management node of new binding between the home address and a c/o address newly obtained.

A mobility management system of the present invention as set forth in claim 3 is the mobility management system according to claim 2, wherein said forwarding means performs such control as to discontinue the forwarding operation to the plurality of c/o addresses, in response to a second request from the mobile node. This configuration permits the binding to be again changed back to one-to-one binding between the home address of the mobile node and a new c/o address.

The packet forwarding operation to the plurality of c/o addresses does not always have to be discontinued, for example, assuming that the mobile node performs soft handover (multi-connections). Namely, the mobility management node sends a plurality of packets continuously to the plurality of c/o addresses, and the mobile node synthesizes and receives a plurality of signals transmitted from a plurality of base stations, thus permitting the mobile node to stably acquire higher-quality packets.

A mobility management system of the present invention as set forth in claim 4 is the mobility management system according to one of claims 1 to 3, wherein said c/o address configuring means performs a search for another access router located within a predetermined range from an access router, and configures a c/o address of the mobile node on the basis of part of an address about an access router obtained by the search and part of an address about the mobile node. This configuration permits the mobility management node to voluntarily configure prospective c/o addresses independently, before receiving a notification from the mobile node.

A mobile node of the present invention as set forth in claim 5 is a mobile node used in the mobility management system as set forth in one of claims 1 to 4, which sends said first request that the mobility management node bind a plurality of c/o addresses to the home address of the mobile node under entry on a cache and that, when receiving a packet to the home address of the mobile node, the mobility management node forward the packet to the plurality of c/o addresses thus bound, and which sends said second request to discontinue the forwarding operation to the plurality of c/o addresses when the mobile node obtains a new c/o address in a new link. This configuration permits the binding to be again changed back to one-to-one binding between the home address of the mobile node and a new c/o address.

A mobility management method of the present invention as set forth in claim 6 is a mobility management method of controlling each of mobility management nodes in a packet telecommunication network, which comprises a plurality of access routers for providing links to a mobile node, and a plurality of mobility management nodes for managing mobility of the mobile node, and in which said mobile node uses a home address continuously used even with change of a connected link to another and a c/o address acquired at every change to a connected link and specifying the mobile node in the connected link, said mobility management method comprising a c/o address configuring step of voluntarily configuring a plurality of new c/o addresses that are probably used by the mobile node after change of a connected link to another, in response to a first request from said mobile node; and a storing step of storing the plurality of c/o addresses thus configured, in binding relation with the home address of the mobile node in a cache.

A mobility management method of the present invention as set forth in claim 16 is A mobility management method of controlling each of mobility management nodes in a packet telecommunication network, which comprises a plurality of mobility management nodes for managing mobility of a mobile node and in which said mobile node uses a home address continuously used even with change of a connected link to another, and a c/o address acquired at every change to a connected link and specifying the mobile node in the connected link, said mobility management method comprising:

a c/o address configuring step in which said mobility management node voluntarily configures a plurality of new c/o addresses that are probably used by the mobile node after change of a connected link to another, in response to a first request from said mobile node; and a storing step in which said mobility management node stores the plurality of c/o addresses thus configured, in binding relation with the home address of the mobile node in a cache.

A mobility management method of the present invention as set forth in claim 7 is the mobility management method according to claim 6, further comprising a forwarding step of, when receiving a packet to the home address stored in binding relation with a plurality of c/o addresses in said cache means, forwarding the packet to the plurality of c/o addresses.

This configuration permits the following operation: when the mobile node moves from a certain link to another link, the mobile node is able to receive a packet forwarded to the c/o addresses independently configured by the mobility management node, before the mobile node notifies the mobility management node of new binding between the home address and a c/o address newly obtained.

A mobility management method of the present invention as set forth in claim 17 is the mobility management method according to claim 16, further comprising a forwarding step in which, when receiving a packet to the home address stored in binding relation with a plurality of c/o addresses in said cache, the mobility management node forwards the packet to the plurality of c/o addresses.

This configuration permits the tunnel forwarding (tunneling) to each of the plurality of forwarding addresses bound to the home address.

A mobility management method of the present invention as set forth in claim 8 is the mobility management method according to claim 7, wherein said forwarding step comprises performing such control as to discontinue the forwarding operation to the plurality of c/o addresses, in response to a second request from the mobile node.

A mobility management method of the present invention as set forth in claim 18 is the mobility management method according to claim 17, wherein in said forwarding step said mobility management node performs such control as to discontinue the forwarding operation to the plurality of c/o addresses, in response to a second request from the mobile node.

This configuration permits the binding to be again changed back to one-to-one binding between the home address of the mobile node and a new c/o address.

The packet forwarding operation to the plurality of c/o addresses does not always have to be discontinued, for example, assuming that the mobile node performs soft handover (multi-connections). Namely, the mobility management node sends a plurality of packets continuously to the plurality of c/o addresses, and the mobile node synthesizes and receives a plurality of signals transmitted from a plurality of base stations, thus permitting the mobile node to stably acquire higher-quality packets.

A mobility management method of the present invention as set forth in claim 9 is the mobility management method according to one of claims 6 to 8, wherein said c/o address configuring step comprises: extracting a prefix part from a link c/o address of the mobile node as a sender of said first request and extracting a hardware address of the mobile node from an interface part of the link c/o address;

performing a search for an access router located within a predetermined range from the AR to which the mobile node is connected to before the handoff, on the basis of an access router list; and adding said interface part to a link prefix part of an access router meeting a condition for the search, thereby configuring c/o addresses of the mobile node.

A mobility management method of the present invention as set forth in claim 19 is the mobility management method according to one of claims 16 to 18, wherein in said c/o address configuring step, said mobility management node extracts a prefix part from a link c/o address of the mobile node as a sender of the first request and extracts a hardware address of the mobile node from an interface part of the link c/o address, said mobility management node performs a search for an access router located within a predetermined range from the AR to which the mobile node is connected to before the handoff, on the basis of an access router list for identifying a plurality of access routers for providing links to the mobile node, and said mobility management node adds said interface part to a link prefix part of an access router meeting a condition for the search, thereby configuring c/o addresses of the mobile node.

This configuration permits the mobility management node to voluntarily configure prospective c/o addresses independently, before receiving a notification from the mobile node.

A mobility management program of the present invention as set forth in claim 10 is a mobility management program for controlling each of mobility management nodes in a packet telecommunication network, which comprises a plurality of access routers for providing links to a mobile node, and a plurality of mobility management nodes for managing mobility of the mobile node, and in which said mobile node uses a home address continuously used even with change of a connected link to another and a c/o address acquired at every change to a connected link and specifying the mobile node in the connected link, said mobility management program comprising a c/o address configuring step of voluntarily configuring a plurality of new c/o addresses that are probably used by the mobile node after change of a connected link to another, in response to a first request from said mobile node; and a storing step of storing the plurality of c/o addresses thus configured, in binding relation with the home address of the mobile node in a cache.

Use of this program permits the following operation: when the mobile node moves from a certain link to another link, the mobile node is able to receive a packet forwarded to the c/o addresses independently configured by the mobility management node, before the mobile node notifies the mobility management node of new binding between the home address and a c/o address newly obtained.

A mobility management program of the present invention as set forth in claim 11 is the mobility management program according to claim 10, further comprising a forwarding step of, when receiving a packet to the home address stored in binding relation with the plurality of c/o addresses in said cache means, forwarding the packet to the plurality of c/o addresses. Use of this program permits the tunnel forwarding (tunneling) to each of the plurality of forwarding addresses bound to the home address.

A mobility management program of the present invention as set forth in claim 12 is the mobility management program according to claim 11, wherein said forwarding step comprises performing such control as to discontinue the forwarding operation to the plurality of c/o addresses, in response to a second request from the mobile node. Use of this program permits the binding to be again changed back to one-to-one binding between the home address of the mobile node and a new c/o address.

The packet forwarding operation to the plurality of c/o addresses does not always have to be discontinued, for example, assuming that the mobile node performs soft handover (multi-connections). Namely, the mobility management node sends a plurality of packets continuously to the plurality of c/o addresses, and the mobile node synthesizes and receives a plurality of signals transmitted from a plurality of base stations, thus permitting the mobile node to stably acquire higher-quality packets.

A mobility management program of the present invention as set forth in claim 13 is the mobility management program according to one of claims 10 to 12, wherein said c/o address configuring step comprises: extracting a prefix part from a link c/o address of the mobile node as a sender of said first request and extracting a hardware address of the mobile node from an interface part of the link c/o address;

performing a search for an access router located within a predetermined range, on the basis of an access router list; and adding said interface part to a link prefix part of an access router meeting a condition for the search, thereby configuring a c/o address of the mobile node. Use of this program permits the mobility management node to voluntarily configure prospective c/o addresses independently, before receiving a notification from the mobile node.

The point is that the mobility agent independently generates the information to be primarily notified of by the BU packet, without notification, so as to omit the step of the mobile node's notifying the mobility agent of the c/o address or the step of the mobile node's notifying the home agent of a new mobility agent on the occasion of change between service areas, thereby decreasing the time before the establishment of the packet forwarding route.

The mobile node according to the present invention comprises sending means for sending a first request such that a mobility management node binds a plurality of c/o addresses to a home address of the mobile node entered on a cache and, when receiving a packet addressed to the home address of the mobile node, forwards this packet to the plurality of bound c/o addresses; and receiving means for receiving the packet forwarded from the mobility management node in response to the first request sent from the sending means.

Accordingly, when the mobile node moves from a certain link to another link, the mobile node is able to receive a packet forwarded to the c/o addresses independently configured by the mobility management node before the mobile node newly notifies the mobility management node of the binding between the home address and a c/o address newly obtained.

The sending means in the mobile node according to the present invention preferably sends a second request for discontinuing the forwarding operation to the plurality of c/o addresses when the mobile node obtains a new c/o address in a new link. Thus, the one-to-one binding between the home address of the mobile node and the new c/o address can be regained.

A mobility management node of the present invention as set forth in claim 20 is the mobility management node for managing mobility of the mobile node, wherein each of said mobility management nodes comprises cache means for storing binding between a home address and a c/o address about the mobile node; c/o address configuring means for voluntarily configuring a plurality of new c/o addresses that are probably used by the mobile node after change of a connected link to another, in response to a first request from the mobile node; and storing means for storing the plurality of c/o addresses thus configured, in binding relation with the home address of the mobile node in said cache means.

A mobility management node of the present invention as set forth in claim 21 is the mobility management node according to claim 20, wherein said mobility management node further comprises forwarding means adapted so that, when receiving a packet to the home address stored in binding relation with a plurality of c/o addresses in said cache means, the forwarding means forwards the packet to the plurality of c/o addresses.

This configuration permits tunnel forwarding (tunneling) to each of the plurality of forwarding addresses bound to the home address.

Accordingly, when the mobile node moves from a certain link to another link, the mobile node is able to receive a packet forwarded to the c/o addresses independently configured by the mobility management node before the mobile node newly notifies the mobility management node of the binding between the home address and a c/o address newly obtained.

A mobility management node of the present invention as set forth in claim 22 is the mobility management node according to claim 21, wherein said forwarding means performs such control as to discontinue the forwarding operation to the plurality of c/o addresses, in response to a second request from the mobile node. This configuration permits the binding to be again changed back to one-to-one binding between the home address of the mobile node and a new c/o address.

A mobility management node of the present invention as set forth in claim 23 is the mobility management node according to claim 20, wherein said c/o address configuring means performs a search for another access router located within a predetermined range from an access router, and configures a c/o address of the mobile node on the basis of part of an address about an access router obtained by the search and part of an address about the mobile node. This configuration permits the mobility management node to voluntarily configure prospective c/o addresses independently, before receiving a notification from the mobile node.

As described above, the mobility agent itself is able to independently configure CoA to omit the step of the mobile node's notifying the mobility agent of CoA or the step of the mobile node's notifying the home agent of the new mobility agent, so as to reduce the time before the establishment of the packet forwarding route, and thus the present invention has the effect of capability of preventing occurrence of a state in which a packet sent from the correspondent node is not delivered to the mobile node.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 7 is a diagram showing the contents of a cache memory at a mobility agent used in the mobility management system according to the present invention.

FIG. 8 is a diagram showing the contents of a cache with an entry in which the M bit is set on.

DESCRIPTION OF THE PREFERRED EMBODIMENTS

Embodiments of the present invention will be described below with reference to the drawings. In each figure referred to in the following description, equivalent portions to those in the other figures will be denoted by the same reference symbols.

Figure 1:
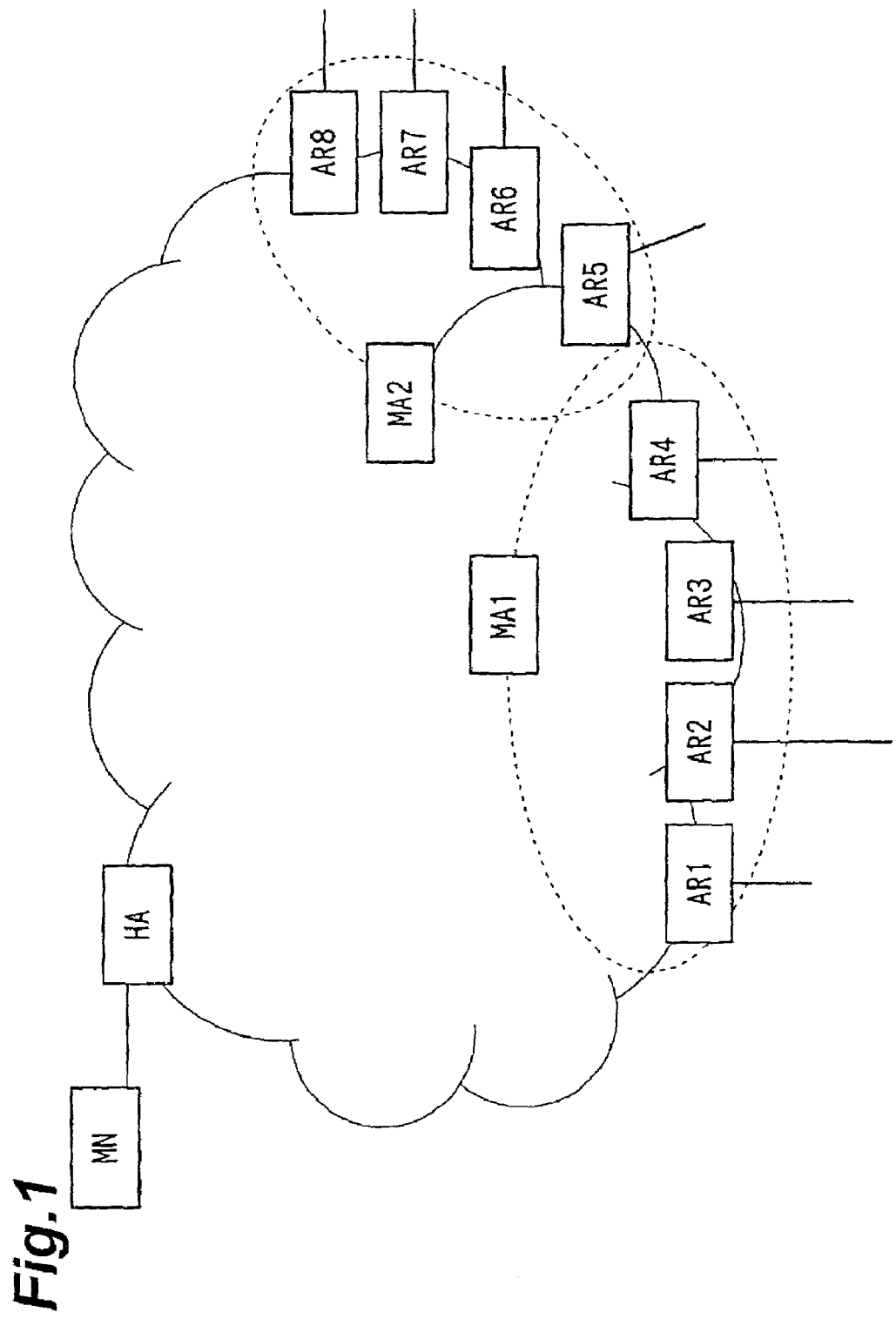
FIG. 1 is an illustration for explaining a network architecture of a conventional packet telecommunication system.
Figure 2:
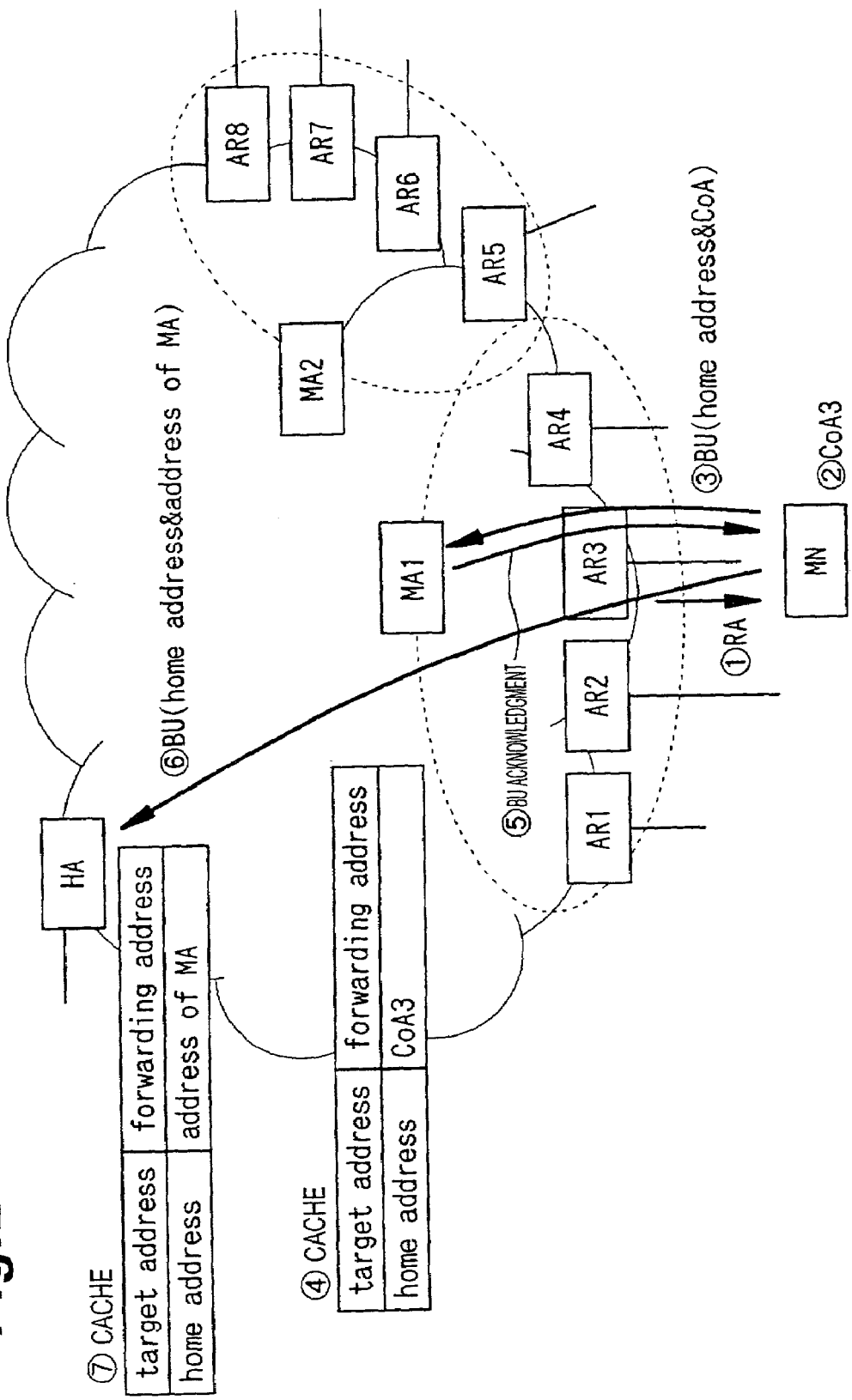
FIG. 2 is an illustration showing the operation of conventional Hierarchical Mobile IPv6.
Figure 3:
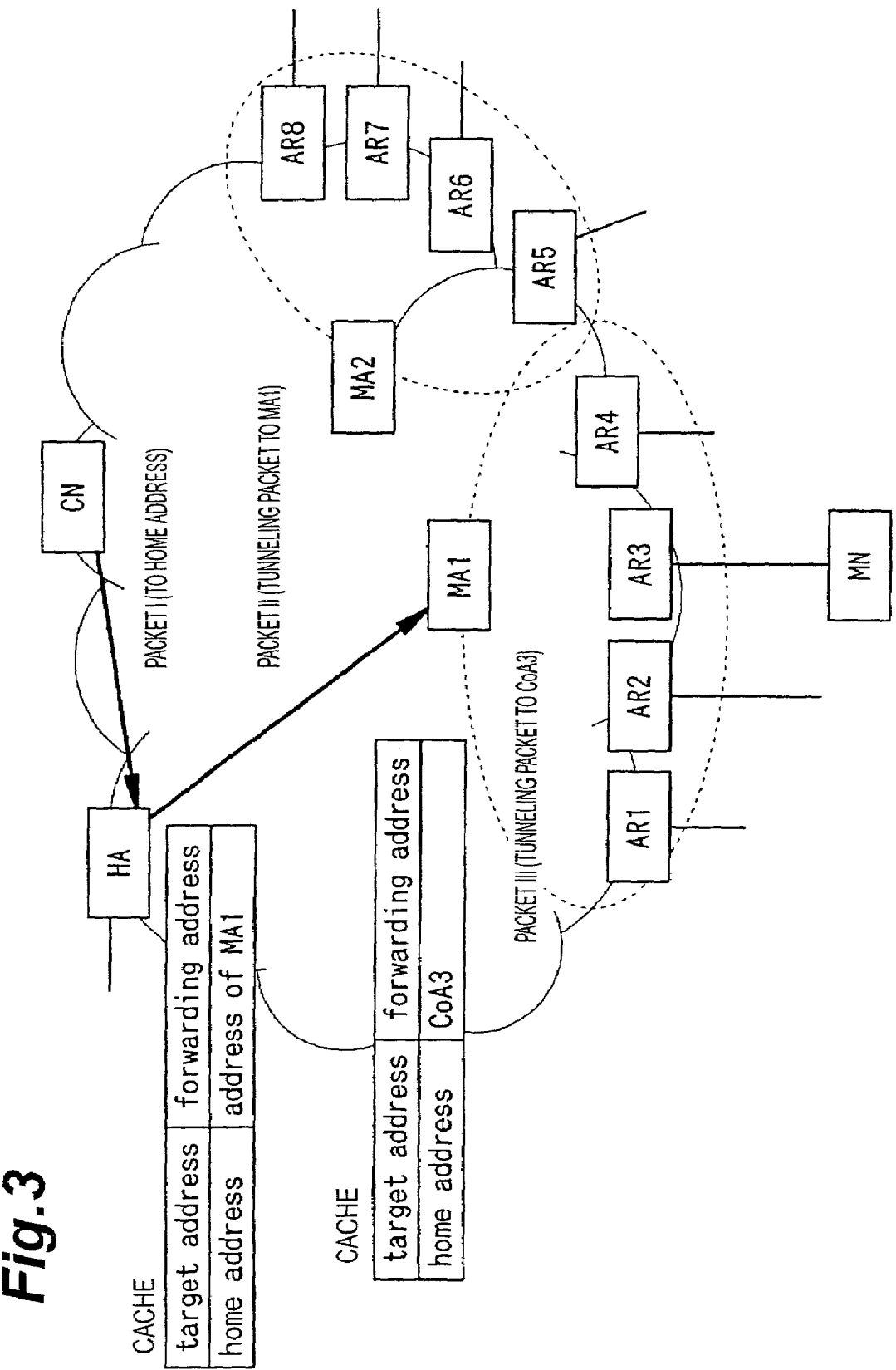
FIG. 3 is an illustration showing a state in which there exist caches at the home agent and at the mobility agent.
Figure 4:
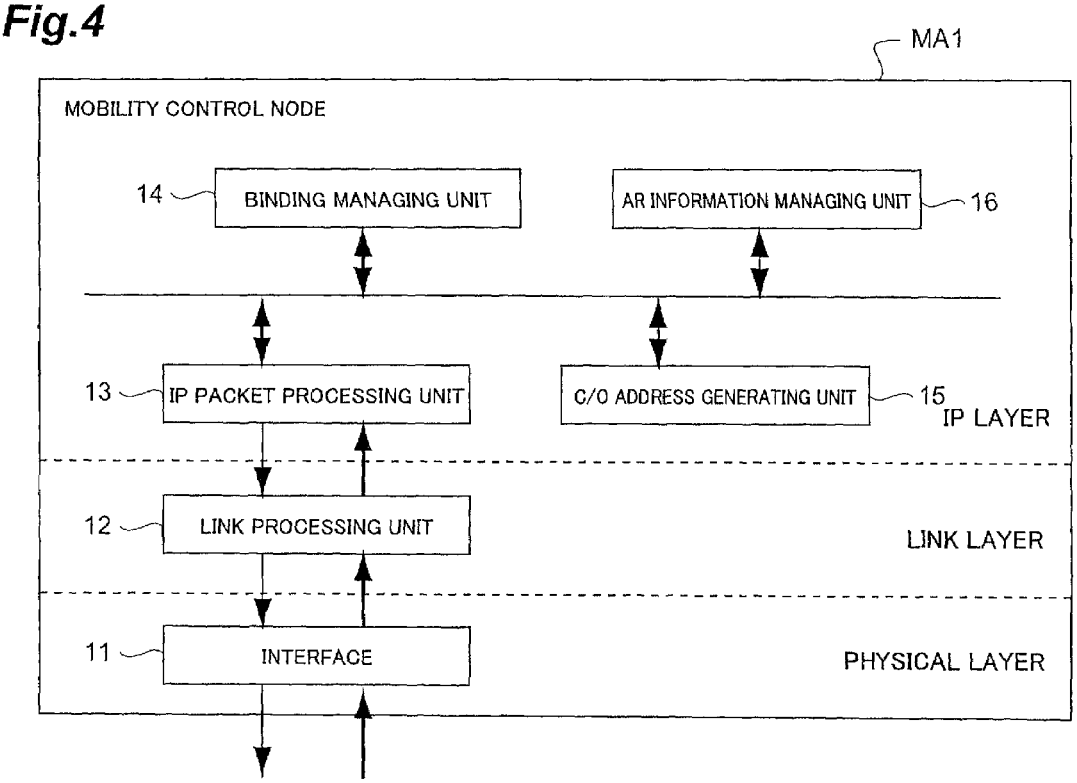
FIG. 4 is a block diagram showing a functional configuration of the mobility agent according to the present invention.

FIG. 4 is a block diagram showing a functional configuration of a mobility agent MA1 serving as the mobility management node according to the present invention. The mobility agent MA1 comprises an interface 11, a link processing unit 12, an IP packet processing unit 13, a binding managing unit 14, a c/o address configuring unit 15 and an access router (AR) information managing unit 16.

The interface 11 is positioned in a physical layer to output the received packet to the link processing unit 12. Further, the interface 11 forwards the packet inputted from link processing unit 12 to other nodes.

The link processing unit 12 is positioned in a link layer to output the packet inputted from the interface 11 to an IP layer. Further, the link processing unit 12 outputs the packet inputted from the IP packet processing unit 13 to the interface 11. The link processing unit 12 also corrects bit errors generated on packet forwarding routes with other nodes.

The IP packet processing unit 13 stores in the binding managing unit 14 the requested binding (i.e., the binding between the home address of the mobile node and the c/o address) whenever the mobility agent MA1 receives the binding request from the mobile node. When receiving a packet addressed to the home address of the mobile node, the IP packet processing unit 13 refers to the binding managing unit 14 and forwards the packet to the c/o address bound to the home address. Further, when a plurality of c/o addresses are bound to the home address, a number of the packets as many as the c/o addresses are configured by copying and then forwarded to each c/o address, respectively.

When the mobility agent MA1 receives a multi-binding request from the mobile node, the IP packet processing unit 13 instructs the c/o address configuring unit 15 to configure c/o addresses to be multi-bound to the home address of the mobile node.

The binding managing unit 14 stores the bound home address of the mobile node and the c/o address. The binding managing unit 14 further stores the multi-bound home address of the mobile node and a plurality of c/o addresses.

The c/o address configuring unit 15 acquires from the IP packet processing unit 13 a host specifying address of the mobile node needed in the configuration of the c/o addresses, and acquires a prefix from the AR information managing unit 16, thus configuring c/o addresses. Then, the plurality of c/o addresses thus configured are bound to the home address of the mobile node and stored in the binding managing unit 14.

The prefix of a link provided by each access router is stored in the AR information managing unit 16.

Figure 5:
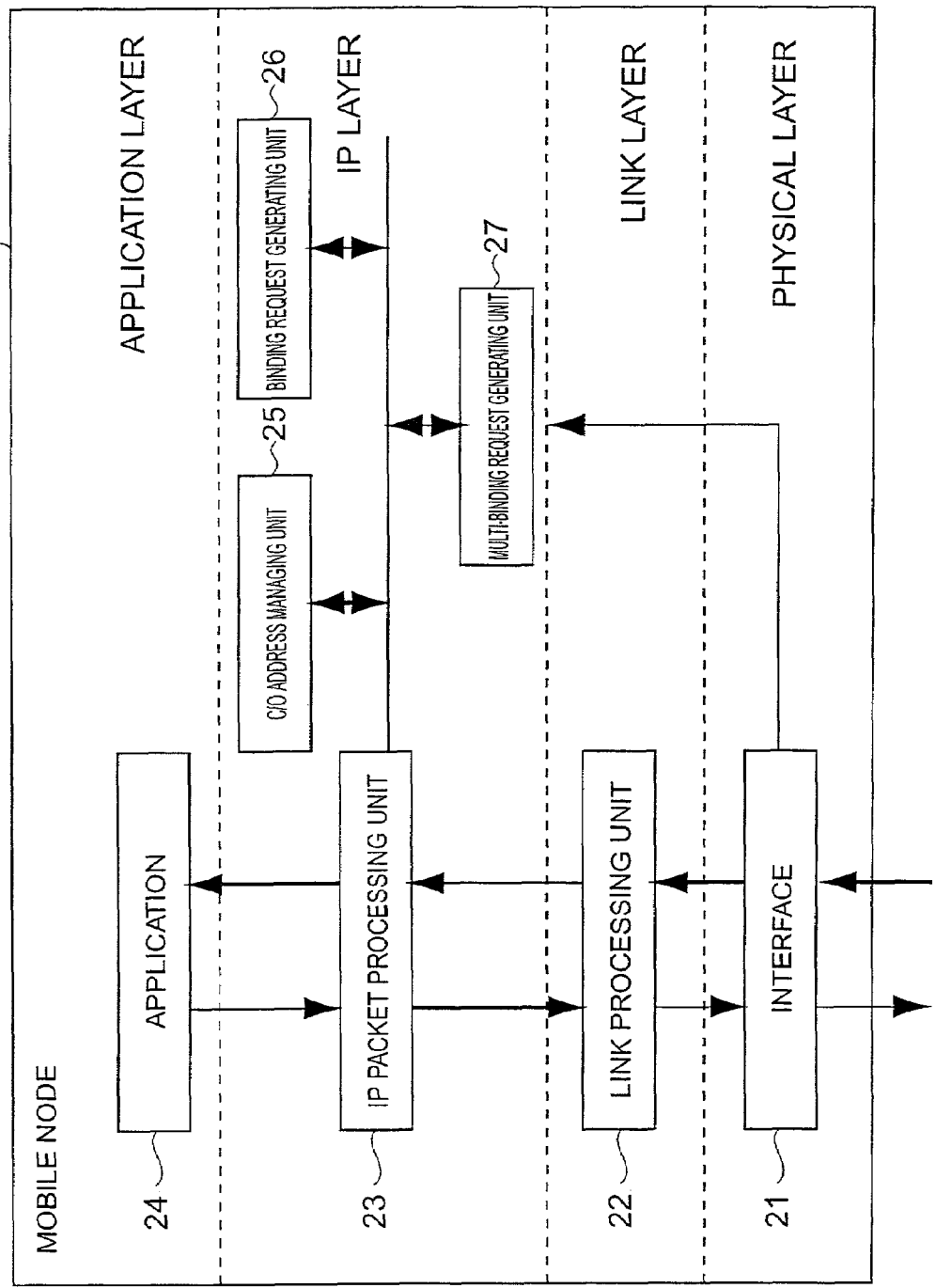
FIG. 5 is a block diagram showing a functional configuration of the mobile node according to the present invention.

FIG. 5 is a block diagram showing a functional configuration of the mobile node MN according to the present invention. The mobile node MN comprises an interface 21, a link processing unit 22, an IP packet processing unit 23, an application 24, a c/o address managing unit 25, a binding request generating unit 26 and a multi-binding request generating unit 27.

The interface 21 is positioned in a physical layer to output the received packet to the link processing unit 22. Further, the interface 21 forwards the packet inputted from the link processing unit 22 to other nodes. Furthermore, the interface 21 constantly monitors the forwarding quality of a wireless channel and notifies the multi-binding request generating unit 27 of the necessity to perform handover shortly when such necessity is detected.

The link processing unit 22 outputs the packet inputted from the interface 21 to an IP layer. The link processing unit 22 further outputs the packet inputted from the IP packet processing unit 23 to the interface 21. The link processing unit 22 corrects bit errors generated on the packet forwarding routes with other nodes.

The IP packet processing unit 23 outputs the packet inputted from a link layer by the link processing unit 22 to the application 24 in an application layer, and outputs the packet inputted from the application layer to the link layer. Further, the input/output of various kinds of data between the IP packet processing unit 23, the c/o address managing unit 25, the binding request generating unit 26 and the multi-binding request generating unit 27 is possible. As described in details hereinafter, the IP packet managing unit 23 outputs the packet related to the configuration of the c/o address to the c/o address managing unit 25.

The application 24 performs input/output of the packet between the IP packet processing unit 23 and itself.

The c/o managing unit 25 configures new c/o addresses, if required.

The binding request configuring unit 26 generates a binding request packet for binding the c/o address acquired from the c/o address managing unit 25 to the home address of the mobile node MN. The binding request packet thus generated is forwarded to the mobility agent MA1 via the IP packet processing unit 23, the link processing unit 22 and the interface 21.

The multi-binding request generating unit 27 generates a multi-binding request packet upon the above-described notification from the interface 21. The multi-binding request packet is a packet for requesting the mobile node MN to bind a plurality of c/o addresses to the home address of the mobile node MN. The multi-binding request packet thus generated is forwarded to the mobility agent MA1 via the IP packet processing unit 23, the link processing unit 22 and the interface 21.

(Packet Format)

Figure 6:
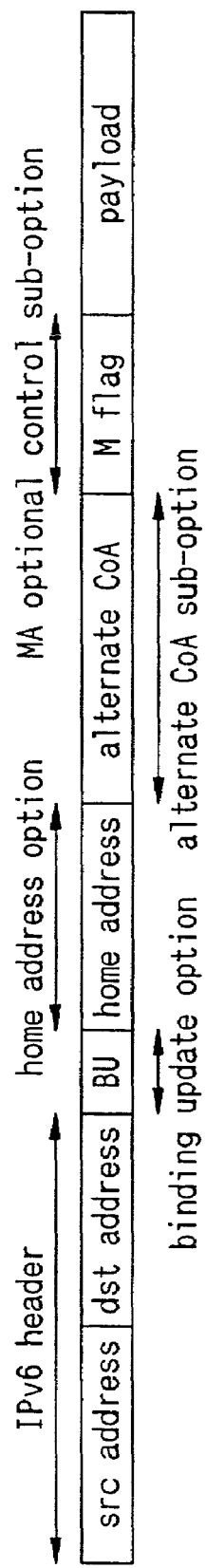
FIG. 6 is a diagram showing a BU packet used in the mobile telecommunication network adopting the mobility management system according to the present invention.

FIG. 6 is an illustration showing a BU packet used in a mobile telecommunication network adopting the mobility management system according to the present invention. In the same figure, the BU packet is comprised of an IPv6 header consisting of a sender address (src address) and a destination address (dst address); a binding update option; a home address option; an alternate CoA sub-option; an MA option control (MA optional control sub-option) in which an M flag (M-flag) is set; and a payload.

The BU packet shown in the same figure includes the M-flag newly added to the conventional BU packet. When this M-flag is set (on), the packet is qualified as a multi-binding on request packet. When the M-flag is off, the packet is qualified as a multi-binding off request packet, or as a normal BU packet. Particularly, in the case where the M-flag is off and this packet is used for discontinuing multi-binding, the packet serves as a multi-binding off request packet. The multi-binding on request packet and the multi-binding off request packet are identical in the packet format per se to the BU packet.

The "multi-binding on request" stated herein is an example of the "first request" stated in claim 1, claim 5, claim 6, claim 9, claim 10, and claim 13. The "multi-binding off request" stated herein is an example of the "second request" stated in claim 3, claim 5, claim 8, and claim 12.

(Contents of Cache)

FIG. 7 is a diagram showing the contents of a cache memory of each mobility agent (corresponding to a mobility management node) used in the present system. The cache shown in the same figure is of a configuration in which an M bit is added to each entry in the conventional cache. In the same figure, where the mobile nodes 1-4 are target addresses, the M bit is off in all the entries and the forwarding addresses are CoA1-CoA4.

FIG. 8 shows the contents of a cache with an entry in which the M bit is on. In the same figure, where the mobile nodes 5, 6, 8 are target addresses, the M bit is off in all the entries thereof and the forwarding addresses are CoA5, CoA6, and CoA11. As for a packet directed to an address with the M bit on (Mobile Node 7), addresses CoA7, CoA8, CoA9, and CoA10 are bound. Therefore, the tunnel forwarding (tunneling) is carried out to each of these forwarding addresses thus bound.

(Operation of the Present System)

Figure 9:
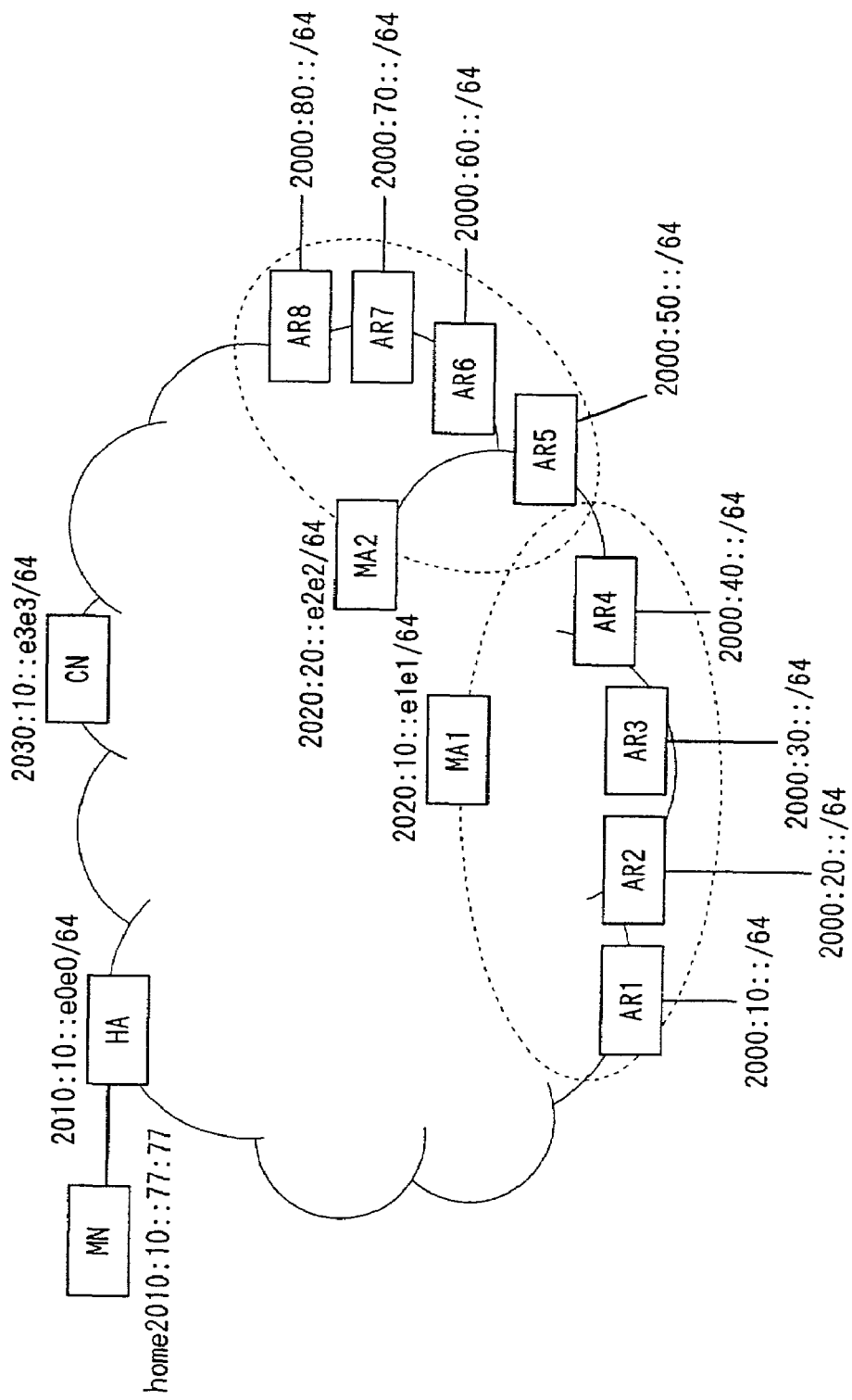
FIG. 9 is an illustration showing addresses of respective nodes in the mobile telecommunication network adopting the mobility management system according to the present invention.

Let us suppose here, as shown in FIG. 9, that the hardware address of the mobile node MN is 00:00:77:77, the link prefix of the home link of the mobile node MN is 2010:10::/64, and the home address of the mobile node MN is 2010:10::77:77. The addresses of the other nodes and the link prefixes of the access routers AR1-AR8 each are assumed to be as shown in FIG. 9. The mobility agent MA2 has a configuration similar to that of the mobility agent MA1. Specifically, the address of the home agent HA is 2010:10::e0e0/64, the address of the mobility agent MA1 is 2020:10::e1e1/64, the address of the mobility agent MA2 is 2020:20::e2e2/64, the address of the correspondent node CN is 2030:10::e3e3/64, the prefix of links provided by the access router AR1 is 2000:10::/64, the prefix of links provided by the access router AR2 is 2000:20::/64, the prefix of links provided by the access router AR3 is 2000:30::/64, the prefix of links provided by the access router AR4 is 2000:40::/64, the prefix of links provided by the access router AR5 is 2000:50::/64, the prefix of links provided by the access router AR6 is 2000:60::/64, the prefix of links provided by the access router AR7 is 2000:70::/64, and the prefix of links provided by the access router AR8 is 2000:80::/64.

Each mobility agent MA1, MA2 holds in an "access router list" (not illustrated in particular), access routers in its service area and, positions (latitudes and longitudes) of access routers around the service area and link prefixes of radio links provided by the access routers.

Figure 10:
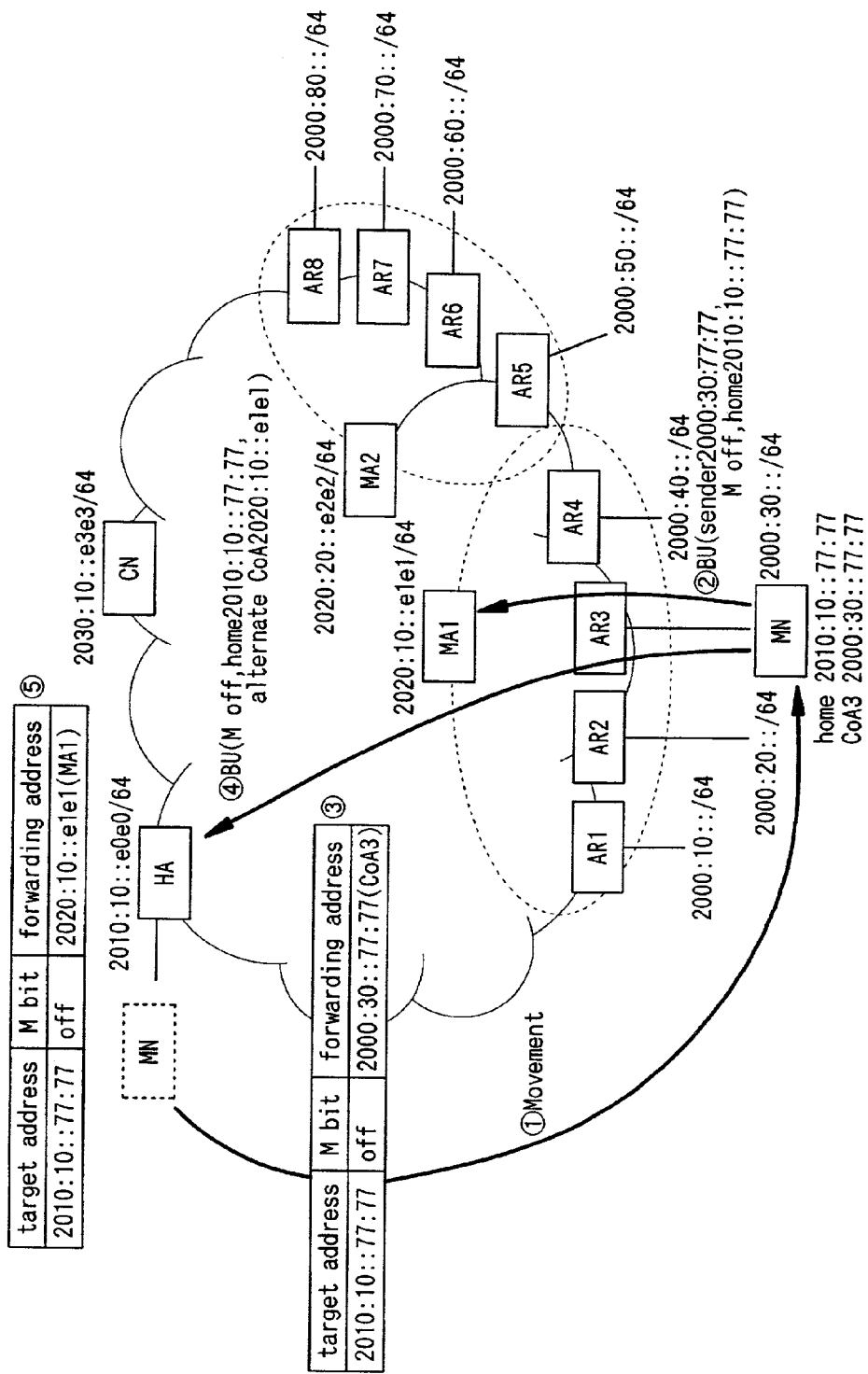
FIG. 10 is an illustration showing the process carried out on the occasion of movement of the mobile node MN.

When the mobile node MN moves in this state, the operation shown in FIG. 10 is performed. In FIG. 10, when the mobile node MN moves to a link of the access router AR3 (①), it receives RA sent from the access router AR3. Subsequently, the mobile node MN acquires a link c/o address CoA3 (2000:30::77:77) and sends a BU packet to the mobility agent MA1 (②). Then the mobility agent MA1 enters it into the binding cache (③). The mobility agent MA1 sends a binding acknowledgement to the mobile node MN. Thereafter, the mobile node MN also sends a BU packet to the home agent HA (④), and the home agent HA enters it into the binding cache (⑤).

Figure 11:
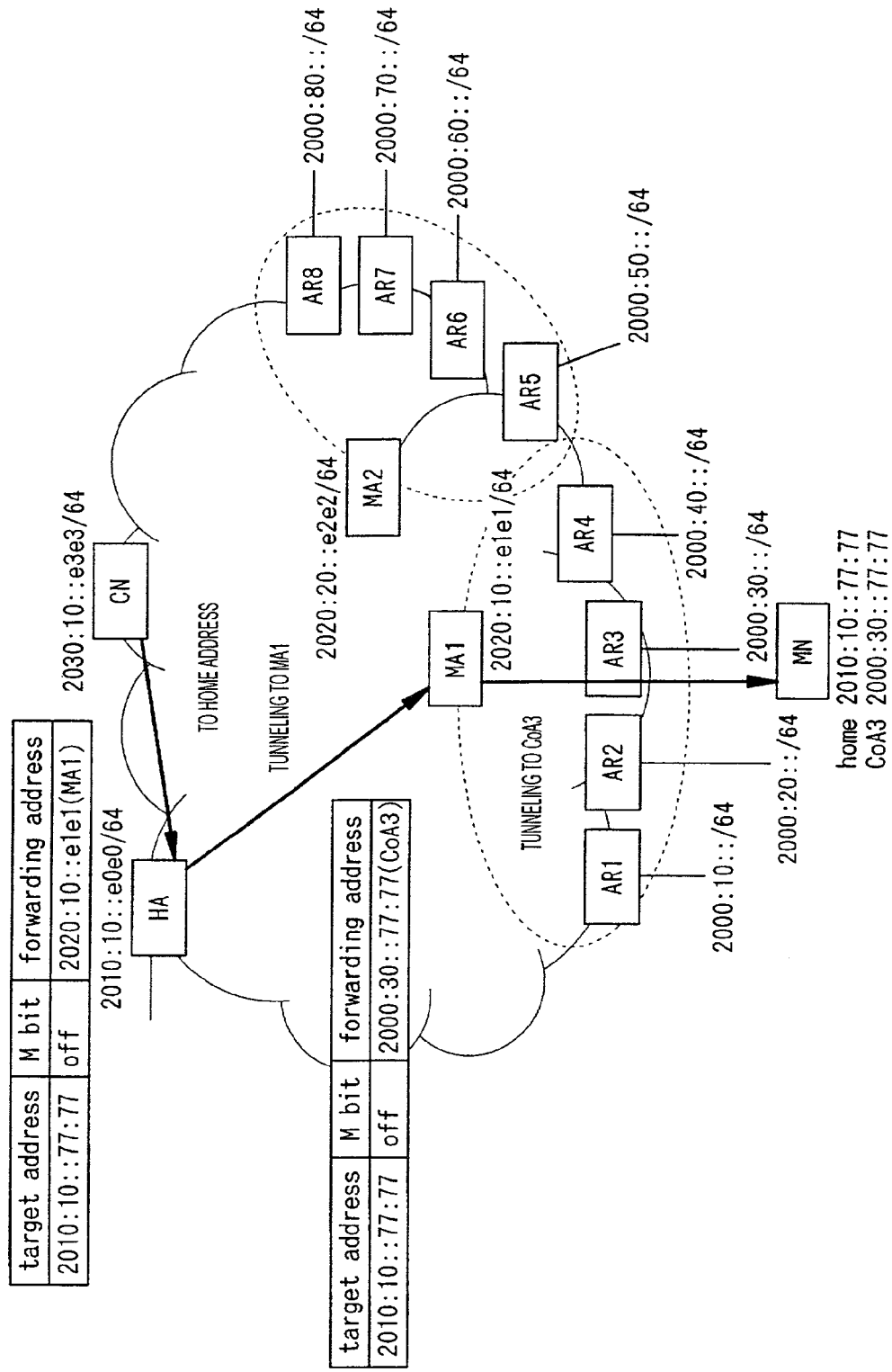
FIG. 11 is an illustration showing the operation subsequent to FIG. 10.

When in this state the correspondent node CN sends a packet to the mobile node MN, as shown in FIG. 11, the packet is tunnel-forwarded (tunneling) from the home agent HA to the mobility agent and then is tunnel-forwarded from the mobility agent to the mobile node MN.

Figure 12:
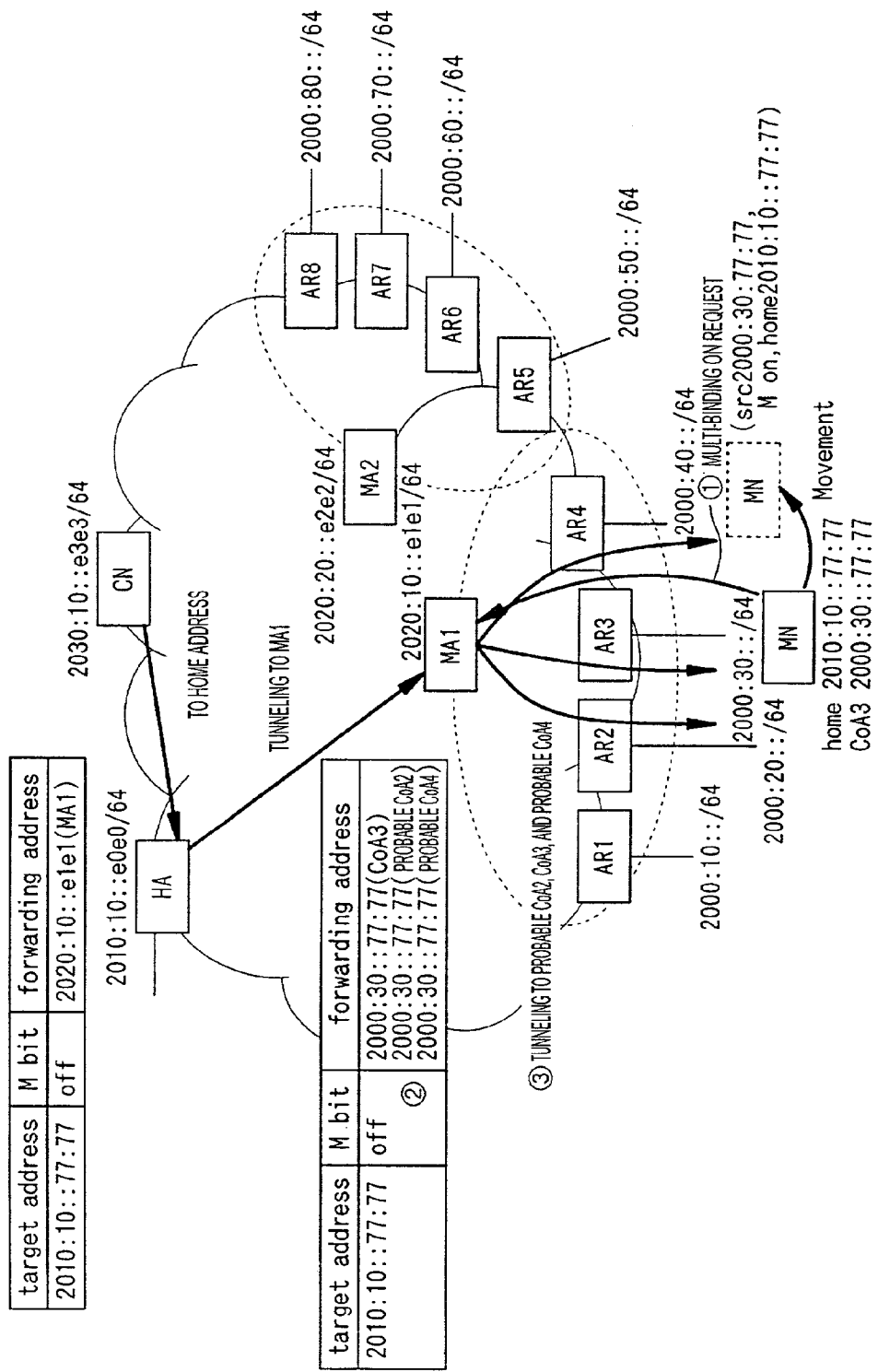
FIG. 12 is an illustration showing the operation subsequent to FIG. 11.

This state is the same as in the conventional Hierarchical Mobile IPv6, but the operation specific to the present system will be carried out if the mobile node MN makes a movement from the access router AR3 to the access router AR4 in FIG. 12.

In the same figure, the mobile node MN sends a multi-binding on request to the mobility agent MA1 and thereafter moves (①). Receiving the multi-binding on request, the mobility agent MA1 performs a process of producing probable CoA's according to the procedure shown in FIG. 13. In this process, the mobility agent is not notified of prospective CoA's from the outside, but the mobility agent voluntarily configures the prospective CoA's. Namely, the mobile node does not notify the mobility agent of CoA's, but the mobility agent itself configures prospective CoA's independently. Hereinafter, the CoA's thus configured will be called, particularly, probable CoA's, in order to discriminate them from CoA that the mobile node MN notifies of by the BU packet.

Figure 13:
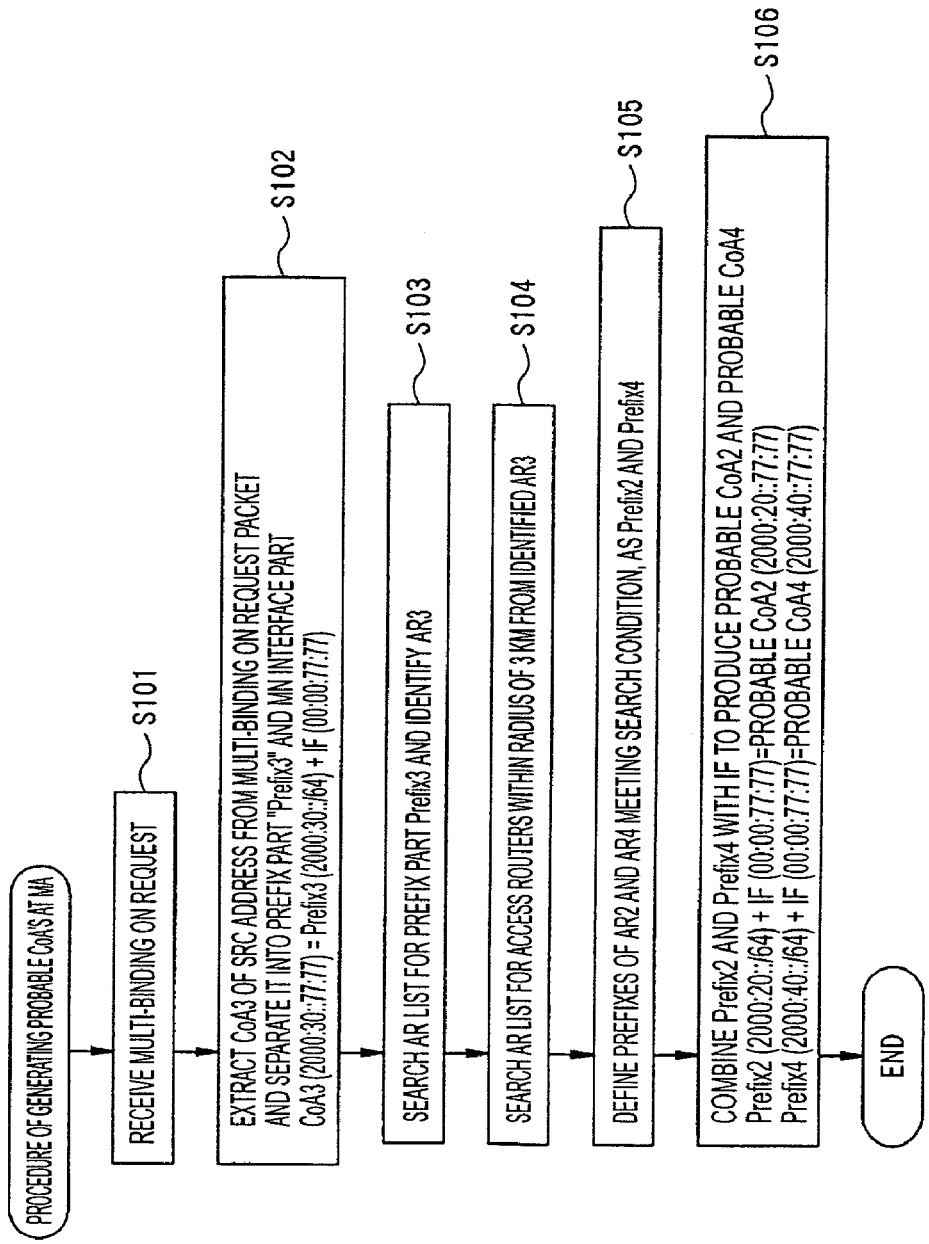
FIG. 13 is a flowchart showing the procedure of the process of configuring probable CoA's.

In FIG. 13, when the mobility agent MA1 receives the multi-binding on request (step S101), it extracts the prefix portion "Prefix3" from the link c/o address of the mobile node MN, which is a sender of the multi-binding on request, and also extracts the hardware address of the mobile node MN from the MN interface portion "IF" (step S102).

In this case, the mobility agent extracts CoA of the sender address from the multi-binding on request packet and separates it into the prefix portion 2000:30::/64 and, the hardware address 00:00:77:77 of the mobile node MN from the MN interface portion.

Then the mobility agent MA1 searches the access router list for 2000:30::/64 and identifies it as the access router AR3 (step S103). Then the mobility agent searches for other access routers located within a predetermined range from the access router AR3, e.g., other access routers located within the radius of 3 km (step S104). Supposing this search results in selecting the access router AR2 and access router AR4 meeting the search condition, the link prefixes of the access routers AR2 and AR4 are defined as Prefix2 and Prefix4 (step S105).

The MN interface portion IF is added to Prefix2 and Prefix4 thus defined, to obtain probable CoA2 and probable CoA4. Namely, the hardware address 00:00:77:77 of the mobile node MN is added to the link prefix 2000:20::/64 of the access router AR2 to obtain probable CoA2 (2000:20::77:77), and the hardware address 00:00:77:77 of the mobile node MN is added to the link prefix 2000:40::/64 of the access router AR4 to obtain probable CoA4 (2000:40::77:77) (step S106). These are used as link c/o addresses of the mobile node MN.

Referring back to FIG. 12, these link c/o addresses voluntarily configured by the mobility agent MA1 are added into the forwarding address field, while the M bit is set on in the entry of the mobile node MN on the binding cache (②).

When thereafter receiving a capsuled packet addressed to the mobile node MN, the mobility agent MA1 tunnel-forwards the packet to CoA3, probable CoA2, and probable CoA4 according to the binding cache (③).

On the other hand, the mobile node MN, having moved to a link provided by the access router AR4, configures CoA4 (2000:40::77:77) from the link prefix 2000:40::/64 of the access router and the hardware address 00:00:77:77 and uses it.

In the prior art, no new route is established unless the mobile node MN configures CoA4 and thereafter notifies the mobility agent MA1 of it; therefore, no packet was forwarded to CoA4 immediately after the transition between links. In contrast to it, the present system is configured to concurrently perform the operation of the mobile node MN changing the connected link and configuring CoA4 and the operation of the mobility agent MA1 configuring probable CoA4. For this reason, at the time when the mobile node MN configures CoA4 and starts using it, the packet addressed to probable CoA4 has already been delivered from the mobility agent MA1 to the link of the access router AR4.

Figure 14:
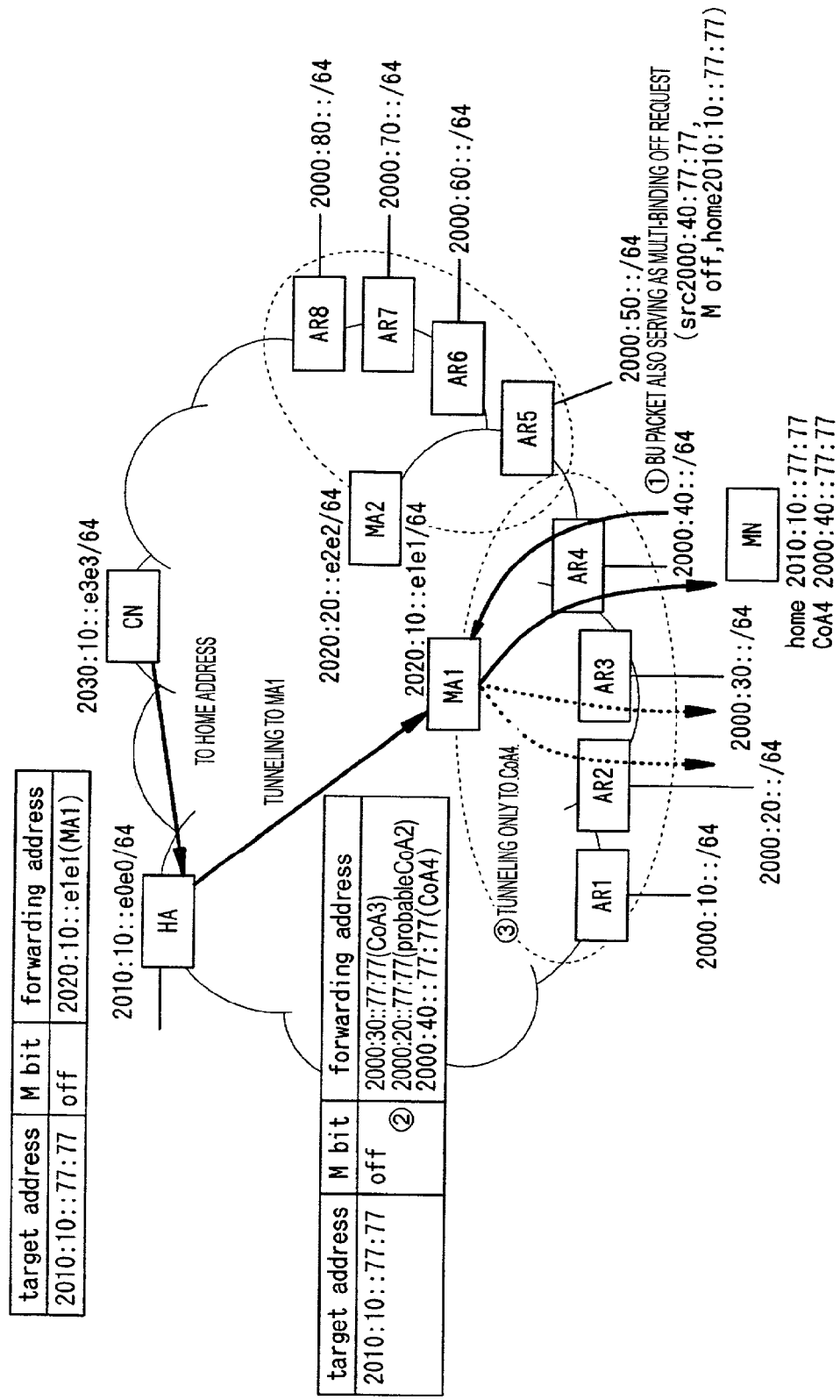
FIG. 14 is an illustration showing the operation subsequent to FIG. 12.

Here the mobile node MN acquires a new link c/o address in the link provided by the access router AR4, according to the operation in the prior art, and then sends a BU packet to notify the mobility agent MA1 of CoA4 (①), as shown in FIG. 14. This BU packet has the M-flag of off and thus also serves as a multi-binding off request. Receiving it, the mobility agent MA1 leaves only CoA4 of the sender of the multi-binding off request in the forwarding address field, sets the M bit off, and deletes the other c/o addresses, on the entries of the mobile node MN in the binding cache (②). Thereafter, the forwarding operation is carried out only to CoA4 (③).

Figure 15:
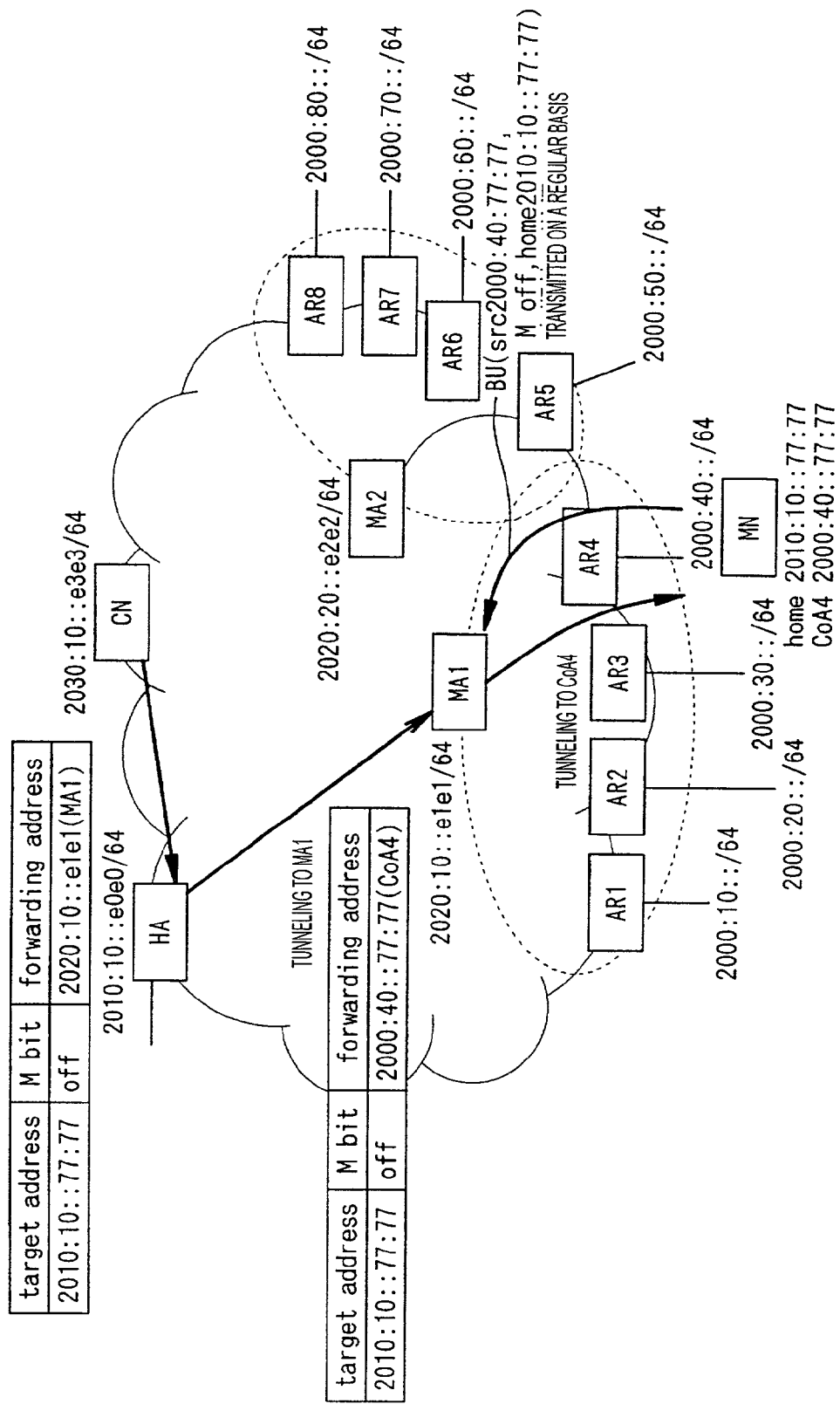
FIG. 15 is an illustration showing a state in which the mobile node can receive a packet from the correspondent node.

Thereafter, as shown in FIG. 15, the mobile node MN is able to receive a packet from the correspondent node CN.

(Operation in the Case of Transition Between Service Areas)

Figure 16:
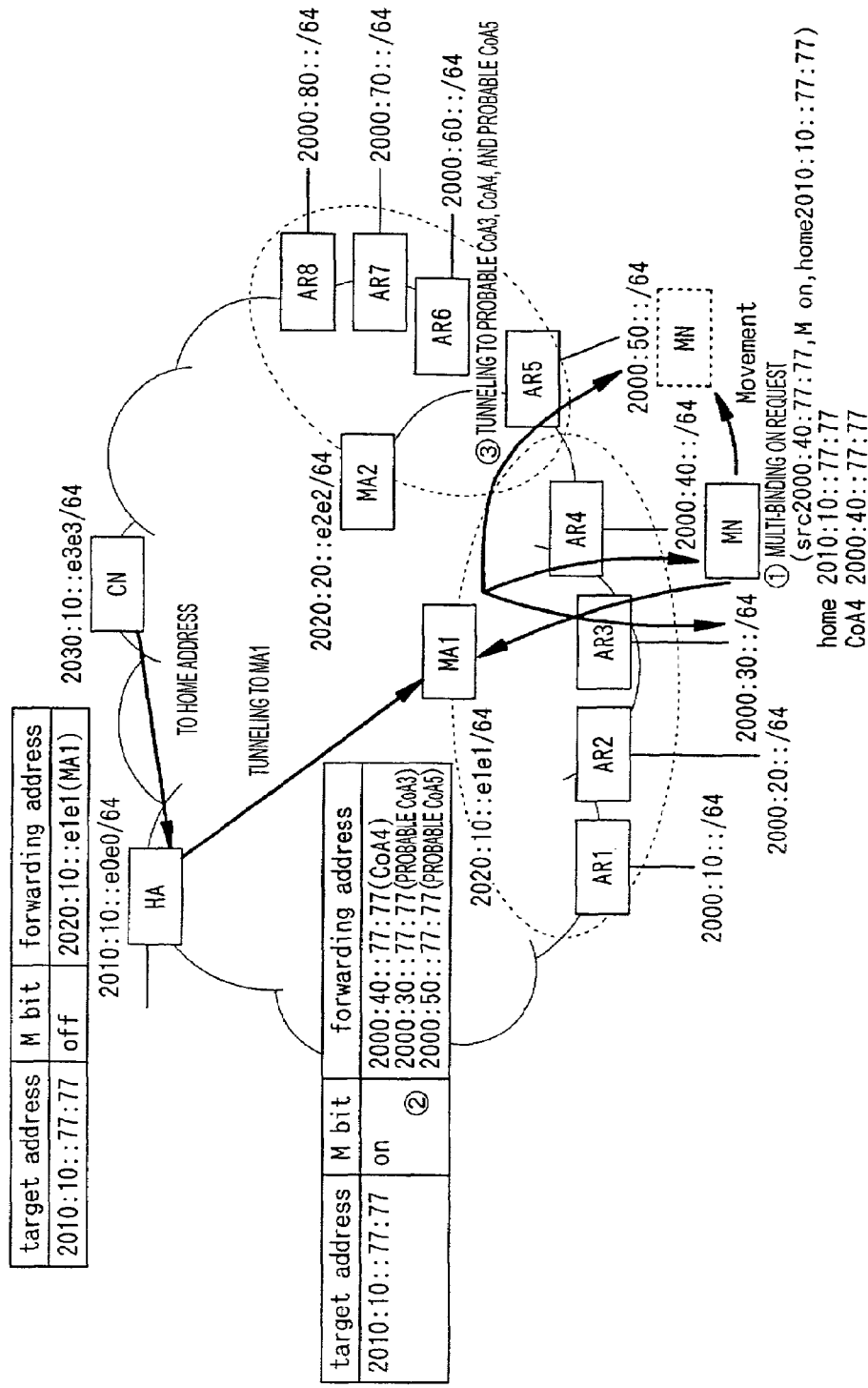
FIG. 16 is an illustration showing the operation in the case where the mobile node further moves across the border between service areas of mobility agents.

FIG. 16 is an illustration showing the operation in the case where the mobile node MN further moves to make a movement between service areas of mobility agents. In the same figure, the mobile node MN sends a multi-binding on request to the mobility agent MA1 (①) and thereafter moves. Receiving it, the mobility agent MA1 starts the tunnel forwarding to CoA4, probable CoA3, and probable CoA5 (② and ③) in similar fashion to the operation described previously.

Figure 17:
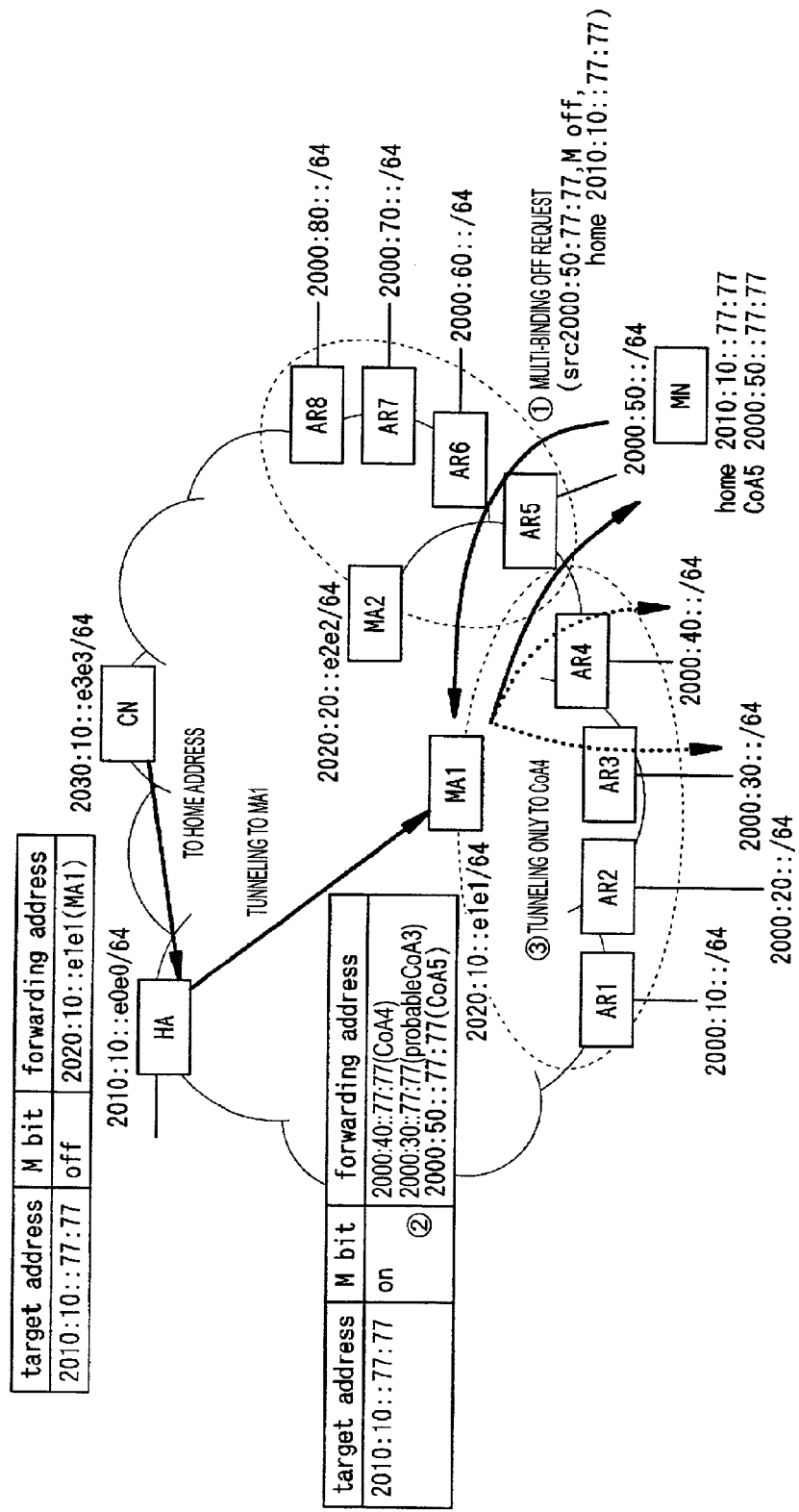
FIG. 17 is an illustration showing the operation subsequent to FIG. 16.

When the mobile node MN detects the movement between service areas, as shown in FIG. 17, the mobile node MN, acquiring a new link c/o address at the movement destination, sends a multi-binding off request to the mobility agent MA1 (①), which is a new operation not carried out in the prior art. The detection of the movement between service areas at the mobile node MN can be substantiated by the operation in which the mobile node MN acquires the address of the new MA from RA. Receiving the request, the mobility agent MA1 sets the M-flag off on the entry of the mobile node MN and deletes the c/o addresses except for the sender address (CoA5) of the multi-binding off request from the forwarding address field on the entry of the mobile node MN (②). Thereafter, a packet addressed to the mobile node MN is tunnel-forwarded only to CoA5 (③).

Particularly, in the case where the mobile node MN changes its connected link across the border between service areas of mobility agents, as described above, the mobile node MN has to send the multi-binding off request to the mobility agent MA1, in addition to the BU packet to be sent to the mobility agent MA2 in the prior art.

Figure 18:
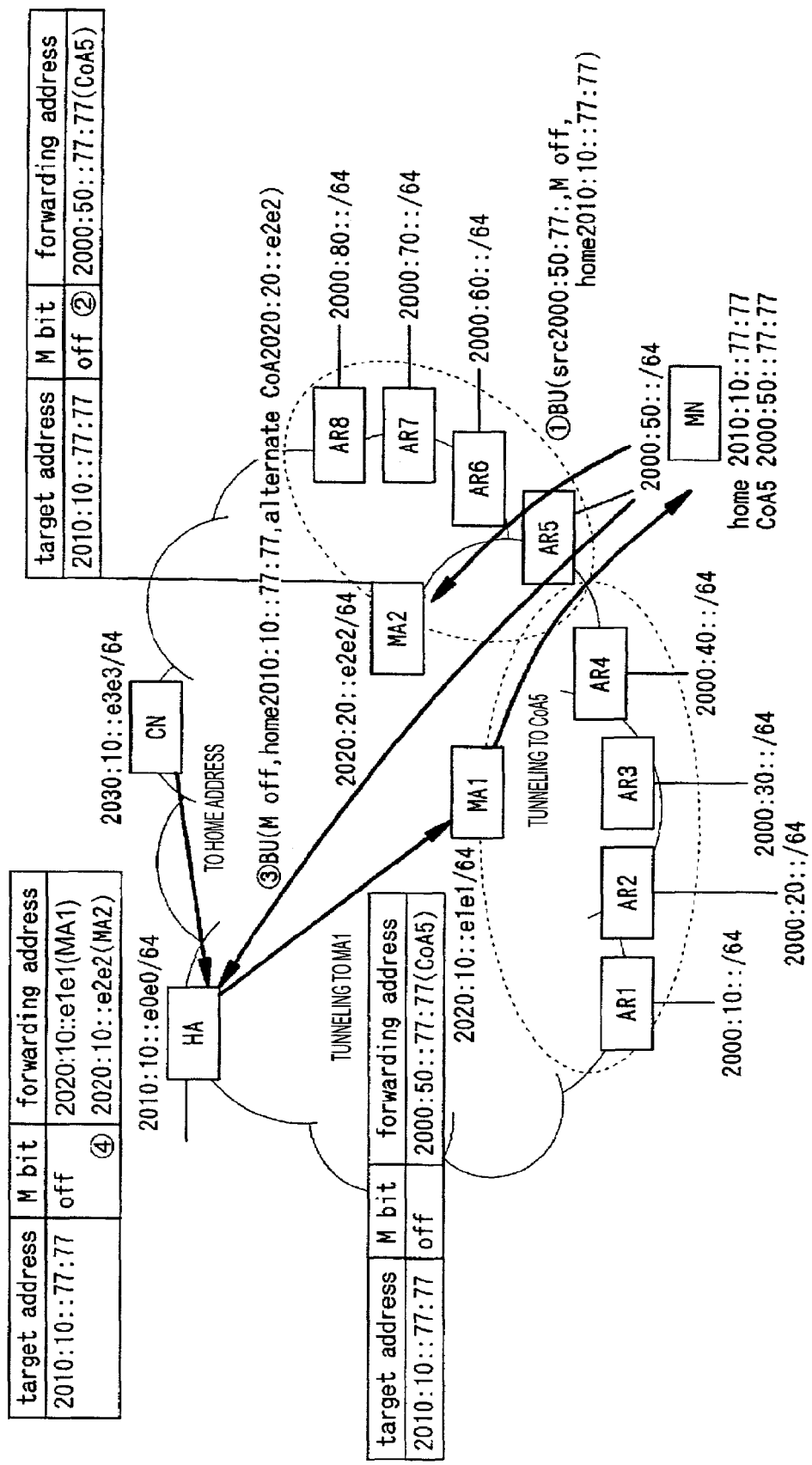
FIG. 18 is an illustration showing the operation subsequent to FIG. 17.

FIG. 18 is an illustration showing a BU packet sending operation carried out in parallel with the above multi-binding off request by the mobile node MN. This BU packet sending operation is carried out as described in the prior art. The mobile node MN, acquiring the new link c/o address, notifies the mobility agent MA2 and the home agent HA of the binding information (① and ③). The new binding information is recorded at the mobility agent MA2 and at the home agent HA (② and ④).

Figure 19:
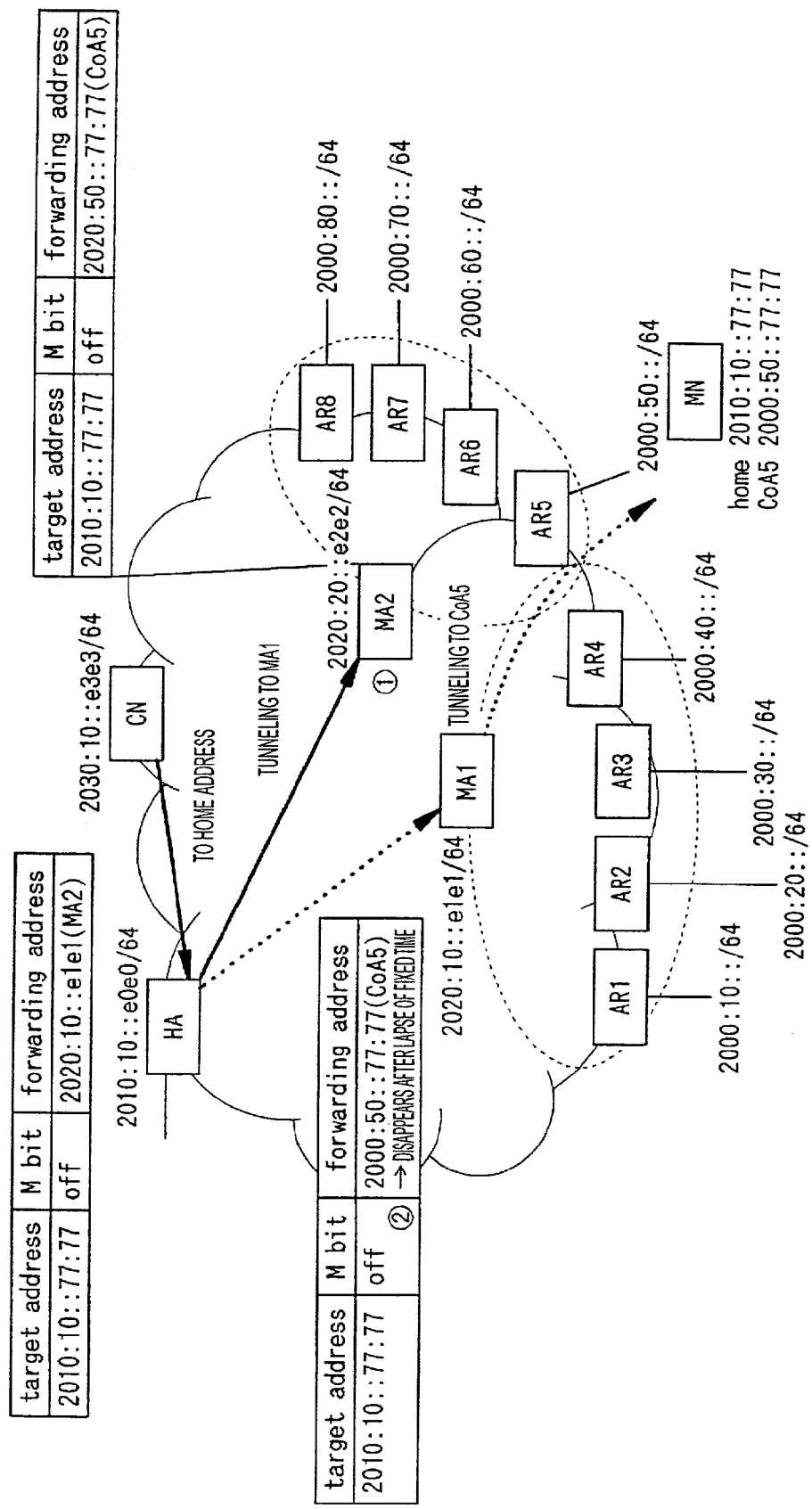
FIG. 19 is an illustration showing the operation subsequent to FIG. 18.

Thereafter, data from the correspondent node CN is delivered to the mobile node MN (①), as shown in FIG. 19. The binding information held at the mobility agent MA1 is held for a definite period and thereafter disappears (②).

Figure 20A:
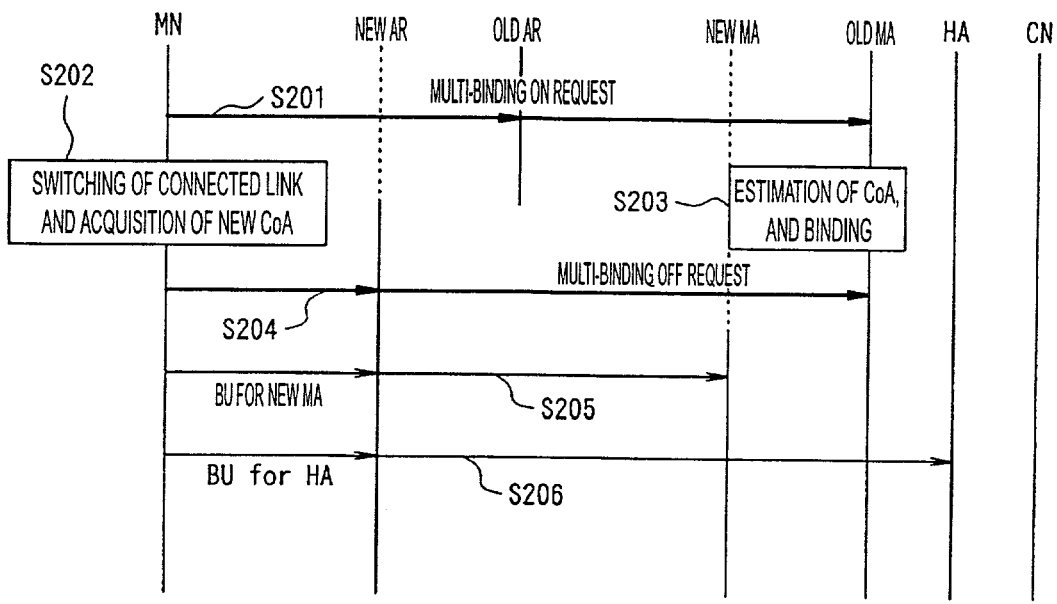
FIG. 20($a$) is a diagram showing the operation in the case where the mobile node moves from a service area of a mobility agent to another and FIG. 20($b$) a diagram showing the operation in the case where the mobile node moves within a service area of the same mobility agent.
Figure 20B:
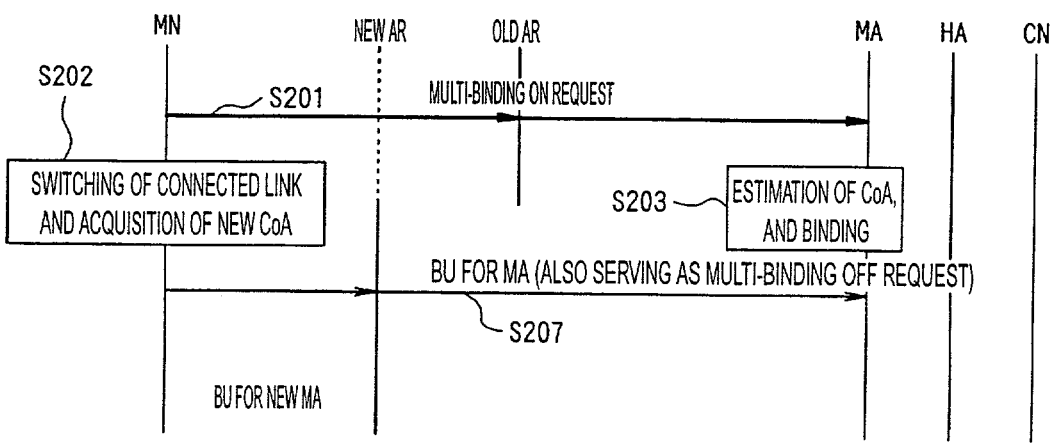

FIG. 20(a) shows the operation in the case where the mobile node MN moves from a service area of a mobility agent MA to another, and FIG. 20(b) the operation in the case where the mobile node MN moves in the service area of the same mobility agent MA. In the two diagrams, the portions added in the present system include the multi-binding on request, CoA estimation and binding, multi-binding off request, and BU for MA indicated by bold face; and S201, S203, S204, and S207 indicated by thick lines.

In FIG. 20(a), when the mobile node MN moves from a service area of one mobility agent MA to another, the mobile node MN first sends a multi-binding on request through the old access router to the old mobility agent MA (S201). Thereafter, the mobile node MN switches the connected link to another and acquires a new CoA (S202). At this time, the old mobility agent MA performs the configuration of probable CoAs and also performs the binding process (S203).

After that, the mobile node MN sends a multi-binding off request to the old mobility agent MA (S204). Subsequent thereto, the mobile node MN generates a BU packet for the new mobility agent MA and sends it through a new access router to the new mobility agent MA (S205). Furthermore, the mobile node MN generates a BU packet for the home agent HA and sends it through the new access router to the home agent HA (S206).

On the other hand, in FIG. 20(b), when the mobile node MN moves within the service area of the same mobility agent MA, the mobile node MN first sends a multi-binding on request through the old access router to the mobility agent MA (S201). After this, the mobile node MN switches the connected link to another and acquires a new CoA (S202). At this time, the mobility agent MA performs the estimation of CoA and the binding process (S203). Then the mobile node MN generates a BU packet for the mobility agent MA and sends it through a new access router to the mobility agent MA (S207). This BU packet also serves as a multi-binding off request. Namely, the mobility agent MA discontinues the multi-binding at the timing of receiving BU for MA from the mobile node MN.

Since all the stored binding information is deleted after a lapse of a fixed period, the mobile node MN sends the BU packet at intervals of a fixed time to the mobility agent MA including the access router AR currently under connection in its service area, and to the home agent even in a stationary state (or even without movement between access routers). Besides, the mobile node MN can send the BU packet periodically to the mobility agent MA and the home agent.

In the system using the method of called "the conventional mobile IP" or called "the hierarchical mobile IP", as described previously, when the mobile node moves between links, the mobility management node is unable to establish a new route of the mobile node until the mobile node notifies the mobility management node of a new address. In contrast to it, in the present system the mobility management node is able to estimate probable new addresses of the mobile node and establish new routes before receiving a notification of a new address from the mobile node. The bottom line is that the mobility management node extracts the hardware address from the known c/o address and combines it with each link prefix to configure prospective c/o addresses, which has permitted decrease in the time before the establishment of the packet forwarding route.

Since the present system is configured so that when the mobile node changes its connected link to another, the mobility management node is able to estimate the probable new c/o addresses before arrival of the notification of the new c/o address from the mobile node at the mobility management node, it is feasible to construct a telecommunication system of the packet switching system quickly establishing the new route and producing less packet loss.

(Mobility Management Method and Mobility Management Program)

In the mobility management system described above, the mobility management method as follows is achieved. Namely, the method is a mobility management method of controlling each of mobility management nodes in a packet telecommunication network, which comprises a plurality of access routers for providing links to a mobile node, and a plurality of mobility management nodes for managing mobility of the mobile node, and in which the mobile node uses a home address continuously used even with change of a connected link to another and a c/o address acquired at every change to a connected link and specifying the mobile node in the connected link, the mobility management method comprising a c/o address configuring step of voluntarily configuring a plurality of new c/o addresses that are probably used by the mobile node after change of a connected link to another, in response to a first request from the mobile node; and a storing step of storing the plurality of c/o addresses thus configured, in binding relation with the home address of the mobile node in a cache.

Also achieved is the mobility management method further comprising a forwarding step of, when receiving a packet to the home address stored in binding relation with a plurality of c/o addresses in the cache means, forwarding the packet to the plurality of c/o addresses.

The above forwarding step comprises performing such control as to discontinue the forwarding operation to the plurality of c/o addresses, in response to a second request from the mobile node.

The above c/o address configuring step comprises: extracting a prefix part from a link c/o address of the mobile node as a sender of the first request and extracting a hardware address of the mobile node from an interface part of the link c/o address;

performing a search for an access router located within a predetermined range, on the basis of an access router list; and adding the interface part to a link prefix part of an access router meeting a condition for the search, thereby configuring a c/o address of the mobile node.

When this mobility management method is adopted in the mobility management node, the mobility agent is able to independently generate the information, which is to be primarily notified of by the BU packet, without notification, so as to omit the step of notifying the mobility agent of CoA or the step of notifying the home agent of the new mobility agent, thereby reducing the time before the establishment of the packet forwarding route.

Furthermore, the mobility management system described above utilizes the mobility management program as follows. Namely, the program is a mobility management program for controlling each of mobility management nodes in a packet telecommunication network, which comprises a plurality of access routers for providing links to a mobile node, and a plurality of mobility management nodes for managing mobility of the mobile node, and in which the mobile node uses a home address continuously used even with change of a connected link to another and a c/o address acquired at every change to a connected link and specifying the mobile node in the connected link, the mobility management program comprising a c/o address configuring step of voluntarily configuring a plurality of new c/o addresses that are probably used by the mobile node after change of a connected link to another, in response to a first request from the mobile node; and a storing step of storing the plurality of c/o addresses thus configured, in binding relation with the home address of the mobile node in a cache. The mobility management method also uses the mobility management program further comprising a forwarding step of, when receiving a packet to the home address stored in binding relation with the plurality of c/o addresses in the cache means, forwarding the packet to the plurality of c/o addresses. The above forwarding step comprises performing such control as to discontinue the forwarding operation to the plurality of c/o addresses, in response to a second request from the mobile node.

The above c/o address configuring step comprises: extracting a prefix part from a link c/o address of the mobile node as a sender of the first request and extracting a hardware address of the mobile node from an interface part of the link c/o address;

performing a search for an access router located within a predetermined range, on the basis of an access router list; and adding the interface part to a link prefix part of an access router meeting a condition for the search, thereby configuring a c/o address of the mobile node.

A recording medium for recording this control program can be selected from various recording media including semiconductor memories, magnetic disks, optical disks, and the like not shown.

When the mobility management node is controlled using the mobility management program as described above, the mobility agent is able to independently generate the information, which is to be primarily notified of by the BU packet, without notification, so as to omit the step of notifying the mobility agent of CoA or the step of notifying the home agent of the new mobility agent, thereby reducing the time before the establishment of the packet forwarding route.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A mobility management system in a packet telecommunication network, comprising:
   a plurality of access routers configured to provide links to a mobile node; and
   a plurality of mobility management nodes configured to manage mobility of the mobile node,
   wherein, the mobile node is configured to use a home address continuously used even with change of a connected link, and a CoA acquired at every change to a connected link and which specifies the mobile node in the connected link,
   wherein each of said mobility management nodes comprises
      cache means for storing binding between a home address and a CoA corresponding to the mobile node;
      CoA configuring means for configuring a plurality of new CoAs that are candidates for use by the mobile node after change of a connected link to another, in response to a first request from the mobile node; and
      storing means for storing the plurality of CoAs thus configured, in binding relation with the home address of the mobile node in said cache means,
      wherein said CoA configuring means performs a search for another access router located within a predetermined range from an access router, and configures a CoA of the mobile node on the basis of part of an address about an access router obtained by the search and part of an address about the mobile node.

2. The mobility management system according to claim 1, wherein each of said mobility management nodes further comprises forwarding means configured to receive a packet to the home address stored in binding relation with a plurality of CoAs in said cache means and forward the packet to the plurality of CoAs.

3. The mobility management system according to claim 2, wherein said forwarding means performs such control to discontinue the forwarding operation to the plurality of CoAs in response to a second request from the mobile node.

4. A mobile node used in the mobility management system as set forth in claim 1,
   the mobile node configured to send said first request that the mobility management node bind a plurality of CoAs to the home address of the mobile node under entry on a cache and that, when receiving a packet to the home address of the mobile node, the mobility management node forward the packet to the plurality of CoAs thus bound, and
   the mobile node further configured to send said second request to discontinue the forwarding operation to the plurality of CoAs when the mobile node obtains a new CoA in a new link.

5. A mobility management method of controlling each of mobility management nodes in a packet telecommunication network, which comprises a plurality of access routers for providing links to a mobile node, and a plurality of mobility management nodes for managing mobility of the mobile node, and in which said mobile node uses a home address continuously used even with change of a connected link to another and a CoA acquired at every change to a connected link and specifying the mobile node in the connected link, said mobility management method comprising:
- a CoA configuring step of voluntarily configuring a plurality of new CoAs that are candidates for use by the mobile node after change of a connected link to another, in response to a first request from said mobile node; and
- a storing step of storing the plurality of CoAs thus configured, in binding relation with the home address of the mobile node in a cache,
- wherein said CoA configuring step further comprises
- extracting a prefix part from a link CoA of the mobile node as a sender of said first request and extracting a hardware address of the mobile node from an interface part of the link CoA;
- performing a search for an access router located within a predetermined range, on the basis of an access router list; and
- adding said interface part to a link prefix part of an access router meeting a condition for the search, thereby configuring a CoA of the mobile node.

6. The mobility management method according to claim 5, further comprising a forwarding step of receiving a packet to the home address stored in binding relation with a plurality of CoAs in said cache means, and forwarding the packet to the plurality of CoAs.

7. The mobility management method according to claim 6, wherein said forwarding step comprises performing control to discontinue the forwarding operation to the plurality of CoAs in response to a second request from the mobile node.

8. A computer storage medium storing a computer program code mechanism which when executed by a computer, causes the computer to perform a method of mobility management for controlling each of mobility management nodes in a packet telecommunication network, which comprises a plurality of access routers for providing links to a mobile node, and a plurality of mobility management nodes for managing mobility of the mobile node, and in which said mobile node uses a home address continuously used even with change of a connected link to another and a CoA acquired at every change to a connected link and specifying the mobile node in the connected link, said mobility management method comprising:
- a CoA configuring step of voluntarily configuring a plurality of new CoAs that are candidates for use by the mobile node after change of a connected link to another, in response to a first request from said mobile node; and
- a storing step of storing the plurality of CoAs thus configured, in binding relation with the home address of the mobile node in a cache
- wherein said CoA configuring step further comprises
- extracting a prefix part from a link CoA of the mobile node as a sender of said first request and extracting a hardware address of the mobile node from an interface part of the link CoA;
- performing a search for an access router located within a predetermined range, on the basis of an access router list; and
- adding said interface part to a link prefix part of an access router meeting a condition for the search, thereby configuring a CoA of the mobile node.

9. The computer storage medium storing a computer program code mechanism of claim 8, further comprising a forwarding step of receiving a packet to the home address stored in binding relation with the plurality of CoAs in said cache means, and forwarding the packet to the plurality of CoAs.

10. The computer storage medium storing a computer program code mechanism of claim 9, wherein said forwarding step comprises performing control to discontinue the forwarding operation to the plurality of CoAs in response to a second request from the mobile node.

11. A mobility management method of controlling each of mobility management nodes in a packet telecommunication network, which comprises a plurality of mobility management nodes for managing mobility of a mobile node and in which said mobile node uses a home address continuously used even with change of a connected link to another, and a CoA acquired at every change to a connected link and specifying the mobile node in the connected link, said mobility management method comprising:
- a CoA configuring step in which said mobility management node voluntarily configures a plurality of new CoAs that are candidates for use by the mobile node after change of a connected link to another, in response to a first request from said mobile node; and
- a storing step in which said mobility management node stores the plurality of CoAs thus configured, in binding relation with the home address of the mobile node in a cache
- wherein in said CoA configuring step further comprises
- extracting a prefix part from a link CoA of the mobile node as a sender of the first request and extracts a hardware address of the mobile node from an interface Part of the link CoA,
- performing a search for an access router located within a predetermined range on the basis of an access router list for identifying a plurality of access routers for providing links to the mobile node, and
- adding said interface part to a link prefix part of an access router meeting a condition for the search, thereby configuring a CoA of the mobile node.

12. The mobility management method according to claim 11, further comprising a forwarding step of receiving a packet to the home address stored in binding relation with a plurality of CoAs in said cache and forwarding the packet to the plurality of CoAs.

13. The mobility management method according to claim 12, wherein in said forwarding step said mobility management node performs control to discontinue the forwarding operation to the plurality of CoAs in response to a second request from the mobile node.

14. A mobility management node for managing mobility of a mobile node, comprising:
- cache means for storing binding between a home address and a CoA corresponding to the mobile node;
- CoA configuring means for voluntarily configuring a plurality of new CoAs that are candidates for use by the mobile node after change of a connected link to another, in response to a first request from the mobile node; and
- storing means for storing the plurality of CoAs thus configured, in binding relation with the home address of the mobile node in said cache means, wherein said CoA configuring means performs a search for another access router located within a predetermined range from an access router, and configures a CoA of the mobile node on the basis of part of an address corresponding to an access router obtained by the search and part of an address about the mobile node.

15. The mobility management node according to claim 14, further comprising forwarding means for receiving a packet to the home address stored in binding relation with a plurality of CoAs in said cache means, and forwarding the packet to the plurality of CoAs.

16. The mobility management node according to claim 15, wherein said forwarding means performs control to discontinue the forwarding operation to the plurality of CoAs in response to a second request from the mobile node.

* * * * *